(12) United States Patent
Hayasaki et al.

(10) Patent No.: US 11,088,626 B2
(45) Date of Patent: Aug. 10, 2021

(54) POWER SUPPLY APPARATUS AND IMAGE FORMING APPARATUS

(71) Applicant: CANON KABUSHIKI KAISHA, Tokyo (JP)

(72) Inventors: Minoru Hayasaki, Mishima (JP); Kazuki Soneta, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 53 days.

(21) Appl. No.: 16/588,105

(22) Filed: Sep. 30, 2019

(65) Prior Publication Data
US 2020/0112263 A1 Apr. 9, 2020

(30) Foreign Application Priority Data
Oct. 4, 2018 (JP) .............................. JP2018-189551

(51) Int. Cl.
*H02M 3/335* (2006.01)
*H02M 1/00* (2006.01)

(52) U.S. Cl.
CPC ... *H02M 3/33592* (2013.01); *H02M 3/33569* (2013.01); *H02M 2001/0009* (2013.01); *H02M 2001/0038* (2013.01); *H02M 2001/0058* (2013.01)

(58) Field of Classification Search
CPC . H02M 2001/0009; H02M 2001/0038; H02M 2001/0058; H02M 3/33569; H02M 3/33592
See application file for complete search history.

(56) References Cited

U.S. PATENT DOCUMENTS

| | | | |
|---|---|---|---|
| 7,120,036 B2 | 10/2006 | Kyono | |
| 8,242,873 B2 | 8/2012 | Hayasaki | |
| 8,503,197 B2 | 8/2013 | Hayasaki | |
| 9,048,739 B2 | 6/2015 | Shoji | |
| 9,304,478 B2 | 4/2016 | Hayasaki | |
| 9,329,561 B2 | 5/2016 | Hayasaki | |
| 9,599,950 B2 | 3/2017 | Hayasaki | |
| 9,621,061 B2 | 4/2017 | Hayasaki | |
| 10,461,644 B1 * | 10/2019 | Gong | H02M 3/1582 |
| 10,566,907 B1 | 2/2020 | Hayasaki | |
| 2004/0125621 A1 * | 7/2004 | Yang | H02M 3/33592 363/21.14 |
| 2006/0171180 A1 | 8/2006 | Kyono | |
| 2014/0369086 A1 * | 12/2014 | Hayasaki | H02M 3/33523 363/21.14 |
| 2015/0109824 A1 * | 4/2015 | Chen | H02M 3/325 363/17 |
| 2016/0241151 A1 * | 8/2016 | Wakabayashi | H02M 3/33592 |

FOREIGN PATENT DOCUMENTS

| | | |
|---|---|---|
| JP | 60-152269 | 8/1985 |
| JP | 4158054 | 10/2008 |

* cited by examiner

*Primary Examiner* — Fred E Finch, III
(74) *Attorney, Agent, or Firm* — Venable LLP

(57) ABSTRACT

The power supply apparatus of a synchronous rectification systems includes a current detection unit configured to detect a current for charging a secondary-side smoothing element, and a driving unit configured to drive a rectification unit based on a detection result by the current detection unit.

12 Claims, 14 Drawing Sheets

POWER SUPPLY APPARATUS AND IMAGE FORMING APPARATUS

BACKGROUND OF THE INVENTION

Field of the Invention

The present invention relates to a power supply apparatus and an image forming apparatus, and particularly relates to a synchronous rectification circuit for a switching power supply apparatus.

Description of the Related Art

As a conventional power supply apparatus, Japanese Patent Application Laid-Open No. S60-152269 discloses the configuration that determines the voltage between both ends of a synchronous rectification switching element by a comparator. Additionally, Japanese Patent No. 4158054 discloses the configuration utilizing the ET product of a transformer as a system that does not directly detect the current.

In recent years, a power supply apparatus that is more efficient than conventional ones has been demanded due to the requirements of environment or standards. In order to further improve the efficiency of a power supply, it is necessary to use a field effect transistor (hereinafter referred to as an FET) with a low on-resistance for a switching element of a synchronous rectification circuit. However, it may be difficult to perform a synchronous rectification operation by the FET with a low on-resistance in the configuration that determines the voltage between the both ends of the switching element of the synchronous rectification circuit by a comparator. Additionally, the system detecting the ET product has a problem that the system cannot be applied to a forward-type power supply apparatus, such as a current resonance type power supply. In order to further improve the efficiency of a power supply, a synchronous rectification circuit is required that is not influenced by the system of a power supply and the on-resistance of the switching element of a synchronous rectification circuit. Additionally, a synchronous rectification circuit that can correspond to various power supply systems is required.

SUMMARY OF THE INVENTION

An aspect of the embodiments in the present invention is a power supply apparatus that improves the efficiency of a power supply apparatus of the synchronous rectification system.

Another aspect of the embodiments in the present invention is a power supply apparatus of a synchronous rectification system, including a transformer including a primary winding and a secondary winding, at least one switching element configured to turn on or off a current flowing into the primary winding, a rectification unit configured to be driven to rectify a current flowing into the secondary winding, and a secondary-side smoothing element configured to smooth a voltage rectified by the rectification unit, a current detection unit configured to detect a current for charging the secondary-side smoothing element, and a driving unit configured to drive the rectification unit based on a detection result by the current detection unit.

A further aspect of the embodiments in the present invention is an image forming apparatus including an image forming unit configured to form an image on a recording material, and a power supply apparatus of a synchronous rectification system, the power supply apparatus being configured to supply electric power to the image forming apparatus, the power supply apparatus including a transformer including a primary winding and a secondary winding, at least one switching element configured to turn on or off a current flowing into the primary winding, a rectification unit configured to be driven to rectify a current flowing into the secondary winding, and a secondary-side smoothing element configured to smooth a voltage rectified by the rectification unit, a current detection unit configured to detect a current for charging the secondary-side smoothing element, and a driving unit configured to drive the rectification unit based on a detection result by the current detection unit.

Still further features of the present invention will become apparent from the following description of exemplary embodiments with reference to the attached drawings.

DESCRIPTION OF THE EMBODIMENTS

Embodiments for implementing the present invention will be described in detail below with reference to the examples and drawings.

Example 1

[Power Supply Apparatus]

Figure 1:
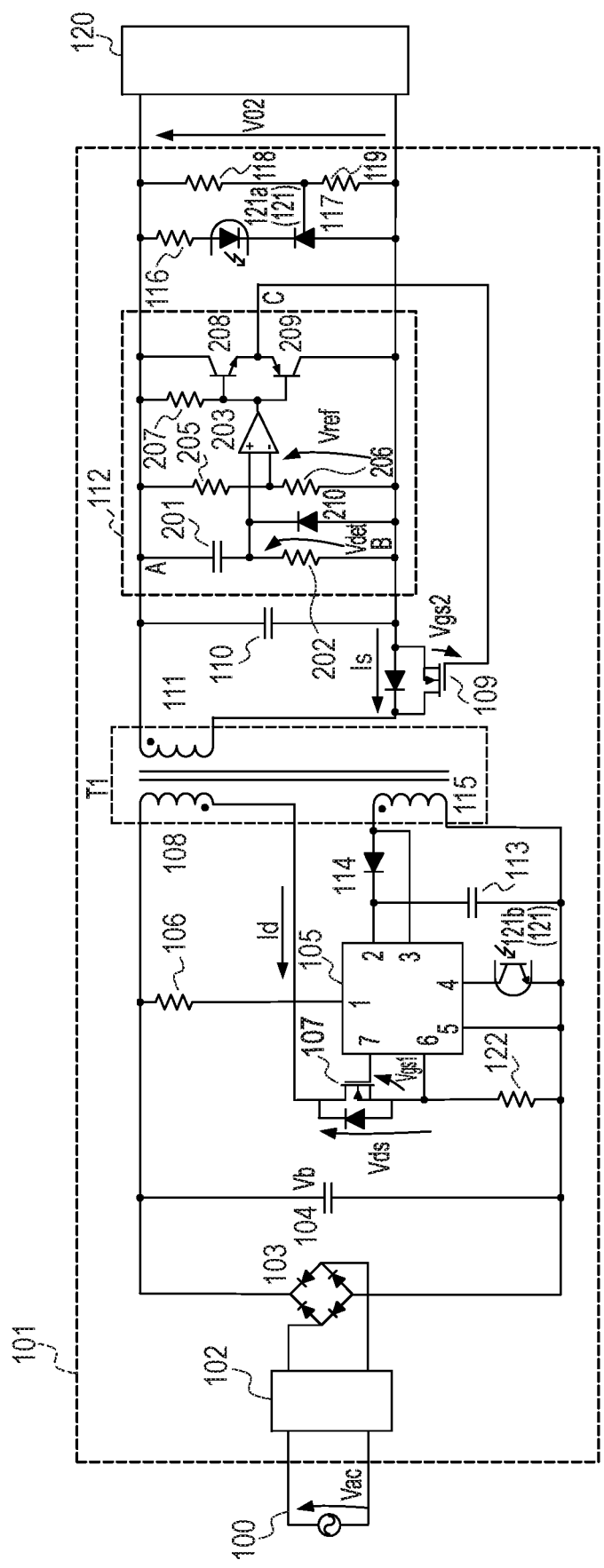
FIG. 1 is a circuit diagram of a switching power supply circuit using a synchronous rectification system of Example 1.

FIG. 1 is a diagram illustrating a power supply apparatus of Example 1, and illustrates, for example, a schematic diagram of a switching power supply circuit using the synchronous rectification system. In Example 1, a pseudo resonance circuit using a general current mode will be described as the system of a switching power supply circuit 101. An AC voltage Vac output by an AC power supply 100, such as a commercial power supply, is input to the switching power supply circuit 101. The switching power supply circuit 101 is converting and outputting the AC voltage Vac input from the AC power supply 100 to an insulated secondary side voltage V02. The secondary side voltage V02 output from the switching power supply circuit 101 is supplied to a load 120. The AC voltage Vac is rectified by a bridge diode 103 via a filter part 102, and is smoothed to a voltage Vb by a capacitor 104 for smoothing.

A switching control unit 105, which is a control unit provided on a primary side, generates a voltage for operating the switching control unit 105 itself via a starting resistance 106 connected to a terminal 1. A capacitor 113 is charged via a terminal 2 with the voltage generated by the switching control unit 105 via the terminal 1. In a case where the voltage of the terminal 2 becomes equal to or more than a predetermined voltage, the switching control unit 105 operates an internal circuit to perform ON/OFF control of the switching element 107 from a terminal 7, which is a gate output terminal. That is, the switching control unit 105 controls the switching operation of the switching element 107. A current detection resistor 122 detects the current of the switching element 107, and supplies a current waveform to a terminal 6 of the switching control unit 105.

A transformer T1 includes a primary winding 108, a secondary winding 111, and an auxiliary winding 115. The primary winding 108 and the secondary winding 111 have reverse polarities, the primary winding 108 and the auxiliary winding 115 have reverse polarities, and the secondary winding 111 and the auxiliary winding 115 have the same polarity. On end of the auxiliary winding 115 of the transformer T1 is connected to an anode terminal of a diode 114, and the voltage induced by the auxiliary winding 115 is rectified and smoothed by the diode 114 and the capacitor 113, and supplies power to the switching control unit 105 via the terminal 2. Additionally, the voltage induced by the auxiliary winding 115 is input to a terminal 3 as a zero-cross detection signal. That is, the switching control unit 105 detects a zero crossing point based on the zero-cross detection signal input to the terminal 3.

The secondary winding 111 is connected to a series circuit where a secondary side smoothing capacitor 110, which is a secondary-side smoothing element, and a rectification element 109 are connected in series. In detail, one end of the secondary winding 111 is connected to one end of the secondary side smoothing capacitor 110, and the other end of the secondary side smoothing capacitor 110 is connected to one end of the rectification element 109. The other end of the rectification element 109 is connected to the other end of the secondary winding 111. As the rectification element 109, a field effect transistor (hereinafter referred to as an FET), for example, a MOSFET, is used. In this case, in the rectification element 109, a source terminal is connected to the other end of the secondary side smoothing capacitor 110, a drain terminal is connected to the other end of the secondary winding 111, and a gate terminal is connected to a terminal C of a current detection circuit 112 described later. The rectification element 109 includes one of a built-in body diode and an external diode connected in parallel.

A resistor 116, a light emitting diode (hereinafter referred to as an LED) 121a of a photocoupler 121, a shunt regulator 117, and resistors 118 and 119 are connected to the secondary side smoothing capacitor 110, and the secondary side smoothing capacitor 110 is functioning as a feedback unit. The output voltage of the secondary side is detected by being divided by the resistors 118 and 119, and being input to the shunt regulator 117. The detected result is transmitted to the primary side via the LED 121a and a phototransistor 121b of the photocoupler 121. The phototransistor 121b of the photocoupler 121 is connected to a terminal 4 of the switching control unit 105, and the switching control unit 105 is adjusting a secondary side voltage V02 (i.e., the output voltage) based on a signal input to the terminal 4. That is, the switching control unit 105 controls the secondary side voltage V02 based on the signal input to the terminal 4 (hereinafter also referred to as a feedback voltage). A terminal 5 of the switching control unit 105 is connected to a low potential side of the capacitor 104 for smoothing.

(Current Detection Circuit 112)

The current detection circuit 112, which is a current detection unit, includes a dividing capacitor 201 whose one end is connected to one end of the secondary side smoothing capacitor 110, and whose other end is connected to one end of a resistor 202, and the resistor 202 whose other end is connected to the other end of the secondary side smoothing capacitor 110. The connection point of the one end of the secondary side smoothing capacitor 110 and the one end of the dividing capacitor 201 constitutes a terminal A of the current detection circuit 112. The current detection circuit 112 includes a resistor 205 whose one end is connected to one end of the secondary side smoothing capacitor 110, and whose other end is connected to one end of a resistor 206, the resistor 206 whose other end is connected to the other end of the secondary side smoothing capacitor 110, and a comparator 203. The connection point of the other end of the resistor 202 and the other end of the secondary side smoothing capacitor 110 constitutes a terminal B of the current detection circuit 112. The connection point of the dividing capacitor 201 and the resistor 202 is connected to a non-inverted input terminal of the comparator 203, and the connection point of the resistor 205 and the resistor 206 is connected to an inverted input terminal. Additionally, a cathode terminal of the diode 210 is connected to the non-inverted input terminal of the comparator 203. An anode terminal of the diode 210 is connected to the other end of the secondary side smoothing capacitor 110.

The current detection circuit 112 includes an NPN-type transistor 208 whose collector terminal is connected to one end of the secondary side smoothing capacitor 110, and whose emitter terminal is connected to an emitter terminal of a transistor 209. A base terminal of the transistor 208 is connected to an output terminal of the comparator 203. The comparator 203 outputs the voltage according to a comparison result from the output terminal. A resistor 207 is connected between the base terminal and the collector terminal of the transistor 208. The current detection circuit 112 includes a PNP-type transistor 209 whose emitter terminal is connected to the emitter terminal of the transistor 208, and whose collector terminal is connected to the other end of the secondary side smoothing capacitor 110. A base terminal of the transistor 209 is connected to the output terminal of the comparator 203. The connection point of the emitter terminal of the transistor 208 and the emitter terminal of the transistor 209 constitutes the terminal C of the current detection circuit 112, and is connected to a control terminal (hereinafter referred to as a gate terminal) of the rectification element 109.

In Example 1, the current detection circuit 112 is configured to detect the voltage between both ends of the secondary side smoothing capacitor 110 based on the voltage divided by the dividing capacitor 201 and the resistor 202. The current of the secondary side smoothing capacitor 110 is divided by the dividing capacitor 201, and converted into a voltage Vdet (hereinafter also referred to as a current detection voltage Vdet) by the resistor 202. The current detection voltage Vdet is also the voltage between both ends of the resistor 202. The current detection voltage Vdet, which was divided by the dividing capacitor 201 and converted by the resistor 202, is input to the non-inverted input terminal (+terminal) of the comparator 203. A first voltage (hereinafter referred to as a reference voltage) Vref, which is obtained by dividing the voltage between both ends of the secondary side smoothing capacitor 110 by the resistors 205 and 206, is input to the inverted input terminal (−terminal) of the comparator 203. The comparator 203 compares the voltage Vdet input to the non-inverted input terminal and the reference voltage Vref input to the inverted input terminal. The output of the comparator 203 is driving the gate terminal of the rectification element 109 by a driving circuit, which is a driving unit including the resistor 207, the transistor 208, and the transistor 209. The rectification element 109 is driven based on the detection result by the current detection circuit 112. Vgs1, Vds, Id, Is, and Vgs2 will be described below.

[Description of Operation]

Figure 2A:
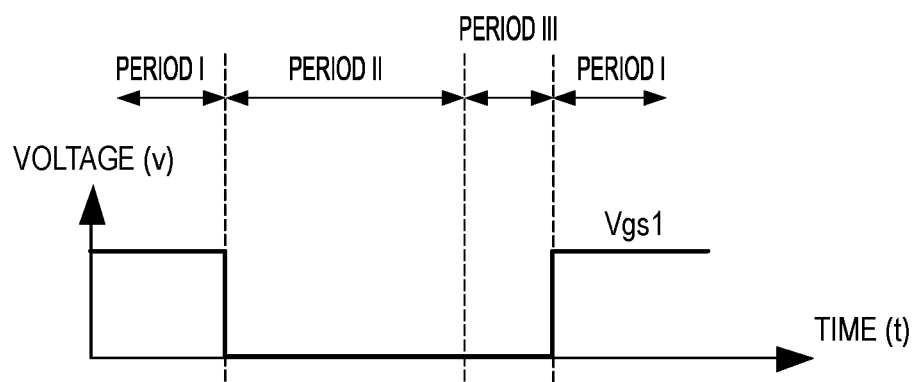
FIGS. 2A, 2B, 2C, 2D, 2E and 2F are graphs for describing the waveforms and operations of each part of Example 1.
Figure 2B:
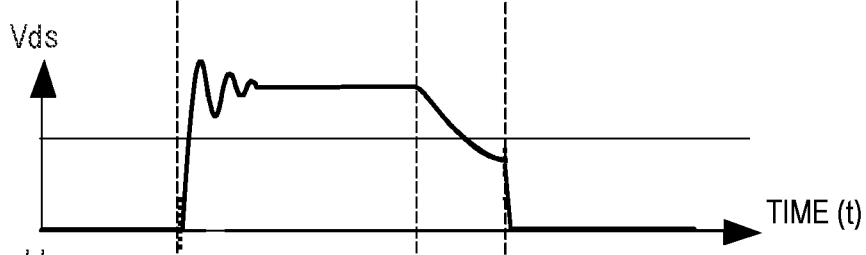
Figure 2C:
Figure 2D:
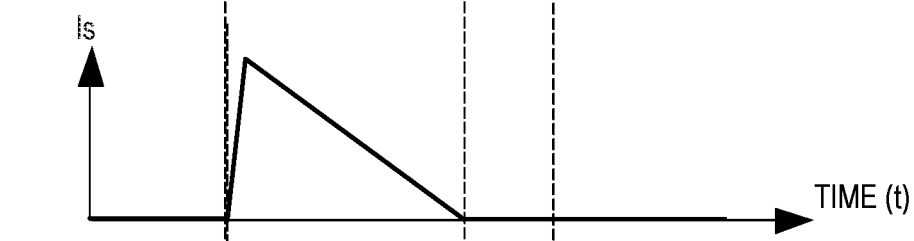
Figure 2E:
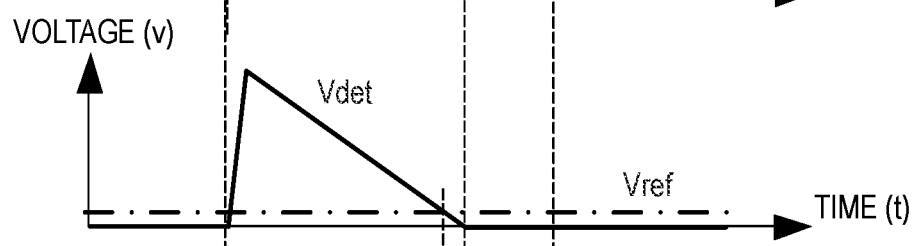
Figure 2F:
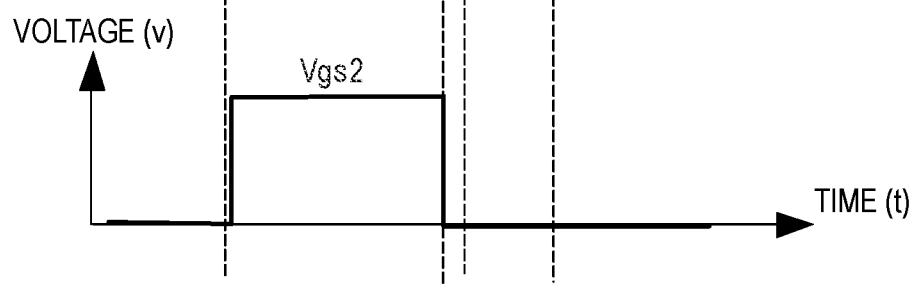

The operation of Example 1 will be described with reference to FIG. 2A to FIG. 2F that illustrate the waveforms of each part when the switching element 107 is turned on and off. FIG. 2A illustrates a gate voltage Vgs1 (v) of the switching element 107, FIG. 2B illustrates a drain-source voltage Vds (v) of the switching element 107, and FIG. 2C illustrates a current Id flowing into the primary winding 108 of the transformer T1. Additionally, FIG. 2D illustrates a current Is flowing into the rectification element 109. In FIG. 2E, a solid line illustrates the current detection voltage Vdet obtained by dividing the current of the secondary side smoothing capacitor 110 by the dividing capacitor 201 and converting by the resistor 202, and a one-dot-chain line illustrates the reference voltage Vref. Further, FIG. 2F illustrates the gate voltage Vgs2 in a case where a MOSFET is used as the rectification element 109. In each figure, the horizontal axis represents the time (t).

(Period I)

In a case where a high-level signal (the gate voltage Vgs1) is input to the gate terminal of the switching element 107 from the terminal 7 of the switching control unit 105, the switching element 107 is turned on. In a case where the switching element 107 is turned on, the drain-source voltage Vds of the switching element 107 becomes a low voltage as shown in FIG. 2B. The voltage Vb of the capacitor 104 for smoothing is applied to the primary winding 108 of the transformer T1. Therefore, as illustrated by the waveform in FIG. 2C, the current Id flowing into the primary winding 108 of the transformer T1 forms a ramp waveform that increases in proportion to the turn-on time of the switching element 107. At this time, a flyback voltage is not generated on the secondary side. Therefore, as illustrated in FIG. 2D, the current Is for charging the secondary side smoothing capacitor 110 does not flow.

The current Id flowing into the primary winding 108 is converted into the voltage by the resistor 122. The switching control unit 105 detects the voltage of the resistor 122 by the terminal 6, and compares the voltage with the feedback voltage of the terminal 4. When the switching control unit 105 determines that the voltage of the terminal 6 becomes equal to or more than the feedback voltage of the terminal 4, the switching control unit 105 renders the output from the terminal 7 in a low level state, and turns off the switching element 107. In this manner, a transition is made from Period I to Period II.

(Period II)

In a case where the switching element 107 is turned off, as illustrated in FIG. 2B, a flyback voltage is generated in the primary winding 108 of the transformer T1, and the drain-source voltage Vds of the switching element 107 is increased. At the time when this flyback voltage is generated, a voltage is induced in the secondary winding 111 of the transformer T1. The power supply of Example 1 is a flyback system. Therefore, the winding direction of the secondary winding 111 is determined, and the secondary winding 111 and the secondary side smoothing capacitor 110 are connected to each other, such that the secondary side smoothing capacitor 110 is charged by the rectification element 109 in a case where the switching element 107 is turned off.

As for the rectification element 109, an N-channel MOSFET, etc. is used, for example. With the body diode built in the FET, or a Schottky barrier diode connected in parallel with (externally provided to) the FET, which is the rectification element 109, the rectification element 109 functions as a diode even if the gate voltage of the FET remains in a low level. At this time, since the rectification element 109 functions as a diode, the drain-source voltage (hereinafter referred to as a drain-source voltage Vds2) of the rectification element 109 turns into a forward voltage (hereinafter referred to as a forward voltage Vf) of the diode. Accordingly, as illustrated in FIG. 2D, the current Is flows into the rectification element 109 with the turning off of the switching element 107. This current Is is detected by the current detection circuit 112, the gate voltage Vgs2 of the rectification element 109 is rendered in a high-level state based on the detected result, and the rectification element 109 is turned on. Specifically, in a case where the current detection voltage Vdet exceeds the reference voltage Vref, the rectification element 109 is turned on.

In a case where the rectification element 109 is turned on, the voltage applied to the drain-source voltage of the rectification element 109 exhibits a voltage drop by the on-resistance (hereinafter referred to as an on-resistance Ron) of the MOSFET. That is, the voltage drop in the rectification element 109 changes from the forward voltage Vf at the time of turning off to the voltage drop by the on-resistance Ron at the time of turning on. Therefore, the voltage that has been applied to the rectification element 109 is decreased, and the loss generated by the current Is reduced. Next, as illustrated in FIG. 2D, if the current immediately before turning off the switching element 107 is a current Idp, the current Is from the secondary winding 111 is linearly decreased while having the current obtained by multiplying the current Idp with the turns ratio of the primary winding 108 to the secondary winding 111 as a peak. This is because it becomes a process in which the energy stored in the transformer T1 is released to the secondary side smoothing capacitor 110. In a case where the current Is is decreased, the current detection voltage Vdet is also decreased as illustrated in FIG. 2E. In a case where the current detection voltage Vdet becomes equal to or less than the reference voltage Vref, the output voltage to the gate terminal of the rectification element 109 is reversed, i.e., the gate voltage Vgs2 becomes a low level, and the rectification element 109 is turned off. Thereafter, in a case where the current Is does not flow, a transition is made from Period II to Period III.

(Period III)

When all the energies of the transformer T1 are released to the secondary winding 111, the drain source voltage Vds1 of the switching element 107 begins a free oscillation. The switching control unit 105 is monitoring the voltage of the auxiliary winding 115 by the terminal 3, and in a case where the oscillation of voltage is decreased, the switching control unit 105 renders the gate voltage Vgs1 output to the gate terminal of the switching element 107 in a high-level state, and turns on the switching element 107. In this manner, a transition is made from Period III to Period I. In the subsequent operations, the above Periods I to III are repeated.

The current detection circuit 112 includes the dividing capacitor 201 and the resistor 202 connected to both ends of the secondary side smoothing capacitor 110, and is detecting the current Is that charges the secondary side smoothing capacitor 110. In a case where the current Is flows into the secondary side smoothing capacitor 110, the voltage between both ends of the secondary side smoothing capacitor 110 begins to rise. At this time, the current flows in the direction from the terminal A to the dividing capacitor 201, the resistor 202, and the terminal B, and the current flowing into the dividing capacitor 201 is subjected to voltage conversion by the resistor 202. The current detection voltage Vdet converted by the resistor 202 is illustrated in FIG. 2E. As described above, the comparator 203 compares the current detection voltage Vdet and the reference voltage Vref, and in a case where the current detection voltage Vdet becomes higher than the reference voltage Vref, the comparator 203 renders the output terminal in an open state.

In a case where the output terminal of the comparator 203 is rendered to be in the open state, the driver circuit including the resistor 207 and the transistors 208 and 209 raises the gate voltage Vgs2 of the rectification element 109, and the rectification element 109 is rendered to be in the turn-on state. FIG. 2F illustrates the gate voltage Vgs2 in a case where a MOSFET is used for the rectification element 109. Since the drain-source voltage of the rectification element 109 can be made lower than a diode by using the element of low on resistance Ron, for example, MOSFET, for the rectification element 109 (in absolute value), a loss decreases.

As illustrated in FIG. 2D, the current Is flowing into the rectification element 109 forms a waveform in which the current value at the timing when the current Is beings to flow is high, and is linearly decreased. The loss in the rectification element 109 is the largest at the timing when the current began to flow into the rectification element 109, and gradually becomes small as the energy stored in the transformer T1 is decreased over time. Then, the current detection voltage Vdet converted by the resistor 202 is also decreased as shown in FIG. 2E. In a case where the current detection voltage Vdet becomes equal to or less than the reference voltage Vref, the output of the comparator 203 is reversed to turn off the rectification element 109.

In Example 1, as an example of the current detection circuit 112, the example has been shown in which the series circuit including the dividing capacitor 201 and the resistor 202 for current detection is connected to both ends of the secondary side smoothing capacitor 110, and the current flowing into the secondary side smoothing capacitor 110 is detected by the resistor 202. In a case where the terminal voltage of the resistor 202 for current detection is small, signal amplification may be performed by using an amplification circuit, such as a transistor.

As described above, according to Example 1, the efficiency of the power supply apparatus of the synchronous rectification system can be improved.

[Power Supply Apparatus]

Figure 3:
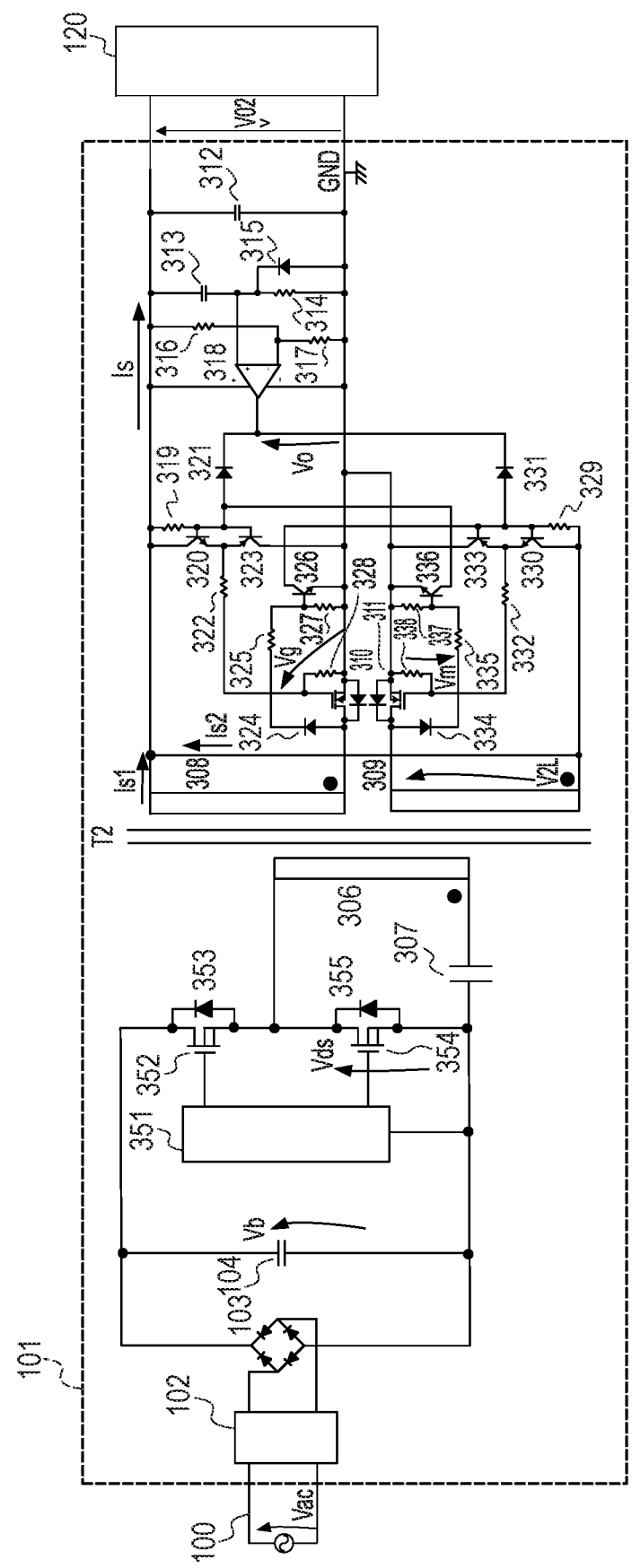
FIG. 3 is a circuit diagram of the switching power supply circuit using a synchronous rectification system of Example 2.

FIG. 3 illustrates a schematic diagram of the switching power supply circuit 101 using the synchronous rectification system, which is the power supply apparatus of Example 2. The same numerals are given to the same configurations as those in Example 1, and a description of such configurations is omitted. The switching power supply circuit 101 of FIG. 3 includes a current resonance circuit using a half bridge. The switching power supply circuit 101 includes a switching control unit 351, a switching element 352, which is a first switching element provided on the high-side side, and a diode 353, which is incorporated in or externally provided to the switching element 352. The switching power supply circuit 101 includes a switching element 354, which is a second switching element provided on the low-side side, and a diode 355, which is incorporated in or externally provided to the switching element 354. In the current resonance circuit, the switching control unit 351 alternately drives the switching element 352 and the switching element 354 with, for example, 50% on-duty (turn-on time), while providing a dead time, which is the period during which both of the elements are in turn-off states.

The primary winding 306 of a transformer T2 forms the resonant circuit with a resonance capacitor 307. The secondary winding 308, which is a first secondary winding of the transformer T2, is transmitting the voltage applied to the primary winding 306 of the transformer T2 to the secondary side with the secondary winding 309, which is a second secondary winding of the transformer T2. The center taps of the secondary windings 308 and 309 are connected to a +terminal of a secondary side smoothing capacitor 312, and the −terminal (GND terminal) side of the secondary side smoothing capacitor 312 is connected to source terminals of rectification elements 310 and 311. Then, a drain terminal of the rectification element 310, which is a first rectification unit, is connected to the secondary winding 308, and a drain terminal of the rectification element 311, which is a second rectification unit, is connected to the secondary winding 309. With such connections, there is no need to use a special power supply for the gate voltage, since the source terminal serves as the GND terminal in both of the rectification elements 310 and 311. Therefore, the circuit can be simply configured.

[Current Detection Circuit]

The current detection circuit of Example 2 includes a dividing capacitor 313 whose one end is connected to one end of the secondary side smoothing capacitor 312, and whose other end is connected to one end of a resistor 314, and the resistor 314 whose other end is connected to the other end (GND terminal) of the secondary side smoothing capacitor 312. The current detection circuit includes a resistor 316 whose one end is connected to one end of the secondary side smoothing capacitor 312, and whose other end is connected to one end of the resistor 317, the resistor 314 whose other end is connected to the GND terminal, and a comparator 318. The connection point of the dividing capacitor 313 and the resistor 314 is connected to a non-inverted input terminal of the comparator 318, and the connection point of the resistor 316 and the resistor 317 is connected to the inverted input terminal. Additionally, a cathode terminal of the diode 315 is connected to the non-inverted input terminal of the comparator 318. An anode terminal of the diode 315 is connected to the GND terminal.

The current detection circuits include an NPN-type transistor 320 whose collector terminal is connected to one end of the secondary side smoothing capacitor 312, and whose emitter terminal is connected to an emitter terminal of a transistor 323. A base terminal of the transistor 320 is connected to an output terminal of the comparator 318 via a diode 321. A resistor 319 is connected between the base terminal and a collector terminal of the transistor 320. The current detection circuit includes a PNP-type transistor 323 whose emitter terminal is connected to the emitter terminal of the transistor 320, and whose collector terminal is connected to the GND terminal. A base terminal of the transistor 323 is connected to the output terminal of the comparator 318 via the diode 321. Note that, as for the diode 321, an anode terminal is connected to the base terminals of the transistors 320 and 323, and a cathode terminal is connected to the output terminal of the comparator 318. Additionally, the base terminals of the transistor 320 and the transistor 323 are connected to a collector terminal of a transistor 336 described later. The connection point of the emitter terminal of the transistor 320 and the emitter terminal of the transistor 323 is connected to the gate terminal of the rectification element 310 via a resistor 322.

As for the rectification element 310, a source terminal is connected to the GND terminal, and a drain terminal is connected to the secondary winding 308. A resistor 328 is connected between the source terminal and the gate terminal of the rectification element 310. The current detection circuit includes a transistor 326, and as for the transistor 326, an emitter terminal is connected to the GND terminal, and a collector terminal is connected to base terminals of a transistor 333 and a transistor 330 described later. A resistor 327 is connected between the emitter terminal and the base terminal of the transistor 326. A circuit in which a diode 324 and a resistor 325 are connected in series is connected to the base terminal of the transistor 326. As for the diode 324, an anode terminal is connected to the GND terminal, and a cathode terminal is connected to one end of the resistor 325. The other end of the resistor 325 is connected to the base terminal of the transistor 326.

The current detection circuits includes an NPN-type transistor 330 whose collector terminal is connected to one end of the secondary side smoothing capacitor 312, and whose emitter terminal is connected to the emitter terminal of the transistor 333. The base terminal of the transistor 330 is connected to the output terminal of the comparator 318 via a diode 331. A resistor 329 is connected between the base terminal and the collector terminal of the transistor 330. The current detection circuit includes a PNP-type transistor 333 whose emitter terminal is connected to the emitter terminal of the transistor 330, and whose collector terminal is connected to the GND terminal. The base terminal of the transistor 333 is connected to the output terminal of the comparator 318 via the diode 331. Note that, as for the diode 331, an anode terminal is connected to the base terminals of the transistors 330 and 333, and a cathode terminal is connected to the output terminal of the comparator 318. Additionally, the base terminals of the transistor 330 and the transistor 333 are connected to the collector terminal of the above-described transistor 326. The connection point of the emitter terminal of the transistor 330 and the emitter terminal of the transistor 333 is connected to the gate terminal of the rectification element 311 via a resistor 332.

As for the rectification element 311, a source terminal is connected to the GND terminal, and a drain terminal is connected to the secondary winding 309. A resistor 338 is connected between the source terminal and the gate terminal of the rectification element 311. The current detection circuit includes a transistor 336, and as for the transistor 336, an emitter terminal is connected to the GND terminal, and a collector terminal is connected to the base terminals of the above-described transistor 323 and transistor 320. A resistor 337 is connected between the emitter terminal and the base terminal of the transistor 336. A circuit in which a diode 334 and a resistor 335 are connected in series is connected to a base terminal of the transistor 336. As for the diode 334, an anode terminal is connected to the GND terminal, and a cathode terminal is connected to one end of the resistor 335. The other end of the resistor 335 is connected to the base terminal of the transistor 336.

Similar to the circuit illustrated in Example 1, the current detection circuit of Example 2 provides the dividing capacitor 313 and the resistor 314 at both ends of the secondary side smoothing capacitor 312, and measures the voltage of the resistor 314. The comparator 318 uses the voltage obtained by dividing the secondary side voltage V02 by the resistors 316 and 317 as the reference voltage Vref, and compares the reference voltage Vref with the current detection voltage Vdet of the resistor 314. In a case where the current detection voltage Vdet is higher than the reference voltage Vref, the comparator 318 renders an output voltage Vo output from the output terminal to be in a high-level state. On the other hand, in a case where the current detection voltage Vdet is equal to or less than the reference voltage Vref, the comparator 318 renders the output voltage Vo to be in a low level state. The signal (i.e., the output voltage Vo) output from the output terminal of the comparator 318 is divided by the diode 321 and the diode 331, so that the signal is output to the rectification element 310 on the secondary winding 308 side, and to the rectification element 311 on the secondary winding 309 side.

A push pull circuit for driving is connected to each of the rectification elements 310 and 311. The current Is flowing into the secondary side smoothing capacitor 312 is the sum of a current Is1 flowing into the secondary winding 308, and a current Is2 flowing into the secondary winding 309 (Is=Is1+Is2). Therefore, it cannot be determined which rectification element should be turned on only by performing the current detection by the resistor 314, and using the output voltage Vo from the comparator 318. Accordingly, a unit is required that determines which rectification element of the rectification elements 310 and 311 should be turned on, and which rectification element should be turned off. Therefore, in Example 2, a circuit (voltage detection unit) is provided that detects the voltage of the secondary winding 308 and the secondary winding 309 to determine the timing at which the rectification elements 310 and 311 can be turned on. In Example 2, in a case where the voltage of the secondary winding 309 is high, in order to turn off the rectification element 310, the diode 324, the resistors 325 and 327, and the transistor 326 are connected. That is, the circuit including the diode 324 and the resistors 325 and 327 functions as a first voltage detection unit, and the transistor 326 functions as a mask unit that masks the rectification element 310 so that the rectification element 310 is turned off. Additionally, in a case where the voltage of the secondary winding 308 is high, in order to turn off the rectification element 311, the circuit including the diode 334, the resistors 335 and 337, and the transistor 336 is connected. That is, the circuit including the diode 334 and the resistors 335 and 337 functions as a second voltage detection unit, and the transistor 326 functions as a mask unit that masks the rectification element 311 so that the rectification element 311 is turned off.

[Description of Operation of Current Detection Circuit]

Figure 4:
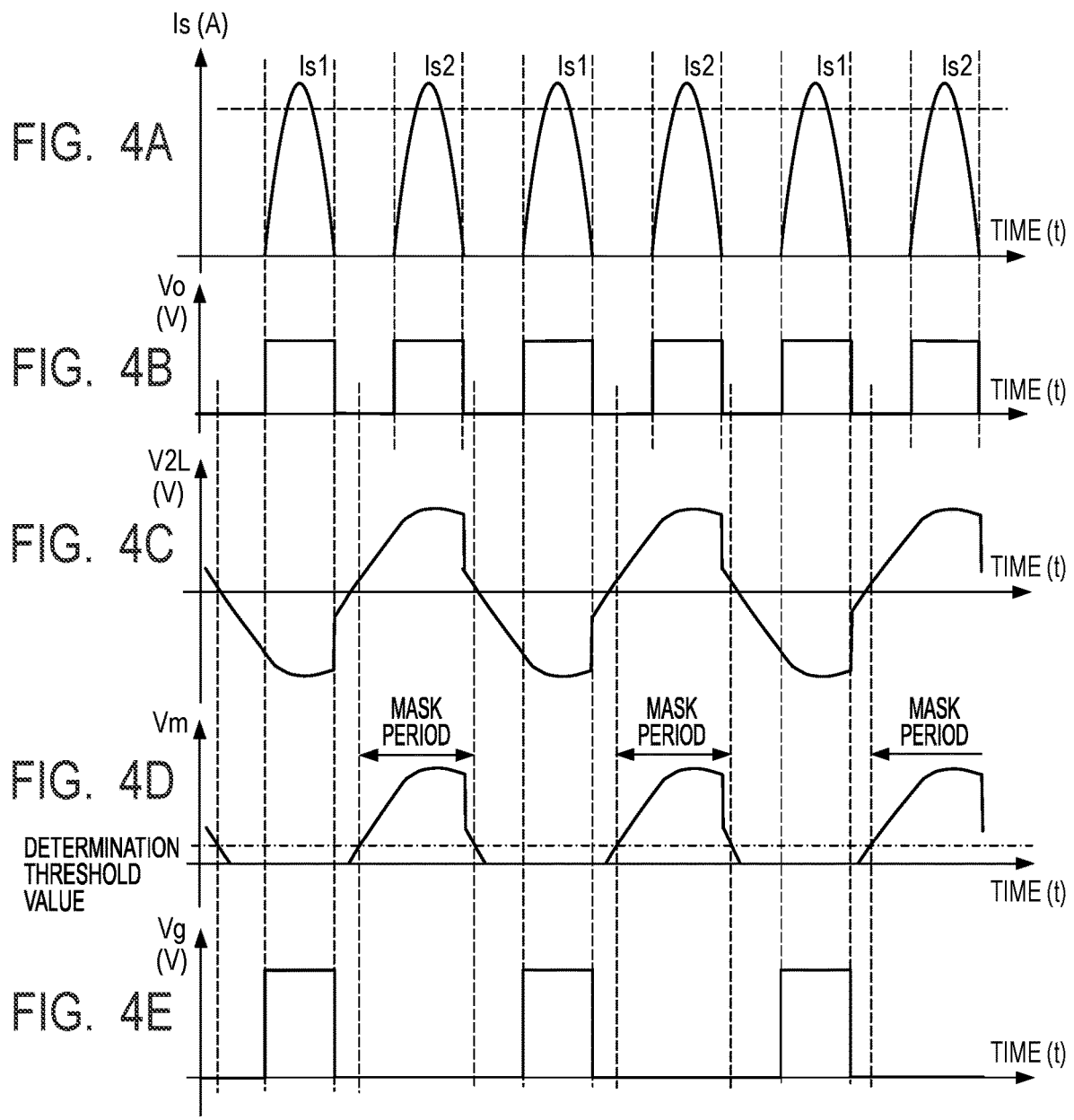
FIGS. 4A, 4B, 4C, 4D and 4E are graphs for describing the waveforms and operations of each part of Example 2.

The waveforms of Example 2 are illustrated in FIG. 4A to FIG. 4E, and the operation of Example 2 is described. FIG. 4A illustrates the current Is (A) of the secondary side smoothing capacitor 312, and FIG. 4B illustrates the output voltage Vo (V) of the comparator 318. FIG. 4C illustrates a voltage V2L (pulse voltage) (V) of the secondary winding 309 of the transformer T2, and FIG. 4D illustrates a gate voltage Vm of the rectification element 311, and illustrates a second voltage (hereinafter referred to as) with a one-dot-chain line. FIG. 4E shows a gate voltage Vg (V) of the rectification element 310. In each figure, the horizontal axis represents the time (t).

As mentioned previously, the current Is of the secondary side smoothing capacitor 312 is the sum of the current Is1 flowing into the secondary winding 308, and the current Is2 flowing into the secondary winding 309 (Is=Is1+Is2). Therefore, the current Is forms a waveform as illustrated in FIG. 4A. That is, the current Is1 flowed into the secondary winding 308, and the current Is2 flowed into the secondary winding 309 will flow alternately. Since the output voltage Vo of the comparator 318 is the voltage output by detecting the current Is that flowed into the secondary side smoothing capacitor 312, the output voltage Vo reacts to both of the current Is1 and the current Is2, and forms a waveform as illustrated in FIG. 4B.

The voltage V2L of the secondary winding 309 forms a waveform as illustrated in FIG. 4C. Since the gate voltage Vm of the rectification element 311 is rectified for the diode 334, the −side is not output. Accordingly, the waveform of the gate voltage Vm becomes as illustrated in FIG. 4D. In FIG. 4D, the period during which the gate voltage Vm exceeds a determination threshold value indicated by the one-dot-chain line is a mask period. That is, in a case where the gate voltage Vm is increased and the voltage obtained by dividing the gate voltage Vm by the resistors 335 and 337 becomes equal to or more than 0.6 V, which is the base emitter voltage of the transistor 336, the transistor 336 is turned on. The determination threshold value in FIG. 4D is the base emitter voltage of the transistor 336. Since the transistor 336 is turned on, irrespective of the output voltage Vo of the comparator 318, the base voltages of the transistors 320 and 323 are decreased, the gate voltage Vg of the rectification element 310 is rendered to be in a low level state, and the rectification element 310 is turned off.

In a case where the voltage appears in the −side of the secondary winding 309, since the transistor 336 is turned off due to the effect of the diode 334, the voltage Vg, which is the gate voltage of the rectification element 310, can be in a high-level state. As illustrated in FIG. 4E, the gate voltage Vg of the rectification element 310 is controlled to turn on the rectification element 310 at the timing when the current Is1 flows, and to turn off the rectification element 310 at the timing when the current Is2 flows. As described above, while the current Is2 is flowing into the secondary winding 309 as the current Is of the secondary side smoothing capacitor 312, the rectification element 310 on the secondary winding 308 side is turned off. In other words, it can be set to be the mask period during which the rectification element 310 is not turned on. Additionally, since it is not set to be the mask period while the current Is1 is flowing into the secondary winding 308 as the current Is of the secondary side smoothing capacitor 312, the rectification element 310 on the secondary winding 308 side is turned on. In this manner, the synchronous rectification operation in the current resonance circuit is enabled with a simple configuration, by masking the rectification element driven based on the detection result of the voltage V2L appearing in the secondary winding 309 at an appropriate timing, while maintaining the number of current detection circuits remains to be one.

As described above, according to Example 2, the efficiency of the power supply apparatus of the synchronous rectification system can be improved.

[Power Supply Apparatus]

Figure 5:
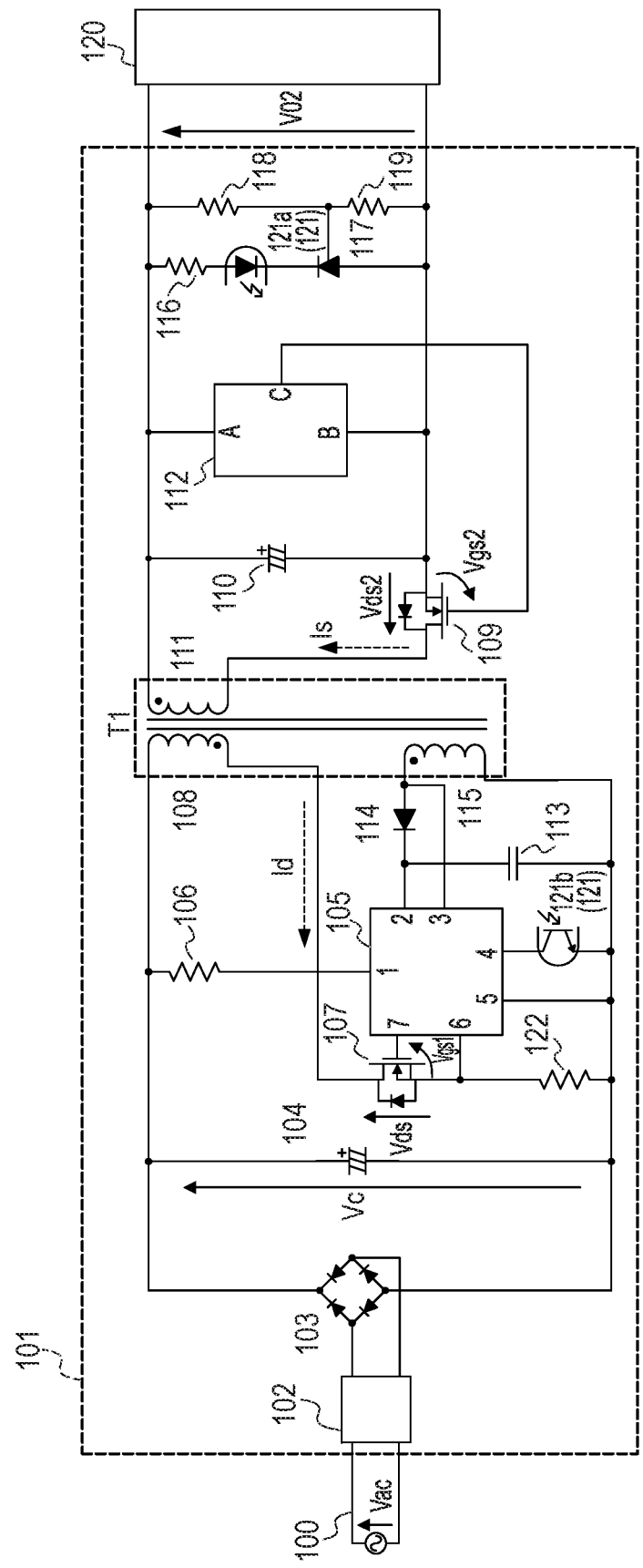
FIG. 5 is a circuit diagram of the switching power supply circuit using a synchronous rectification system of Example 3.
Figure 6A:
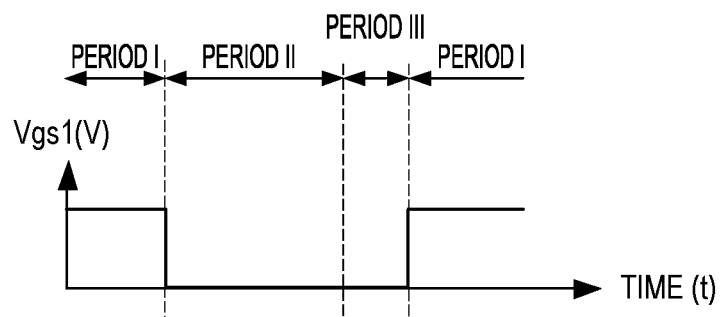
FIGS. 6A, 6B, 6C, 6D, 6E, 6F and 6G are graphs for describing the waveforms and operations of each part of Example 3.
Figure 6B:
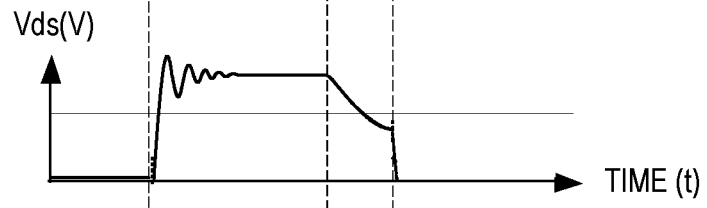
Figure 6C:
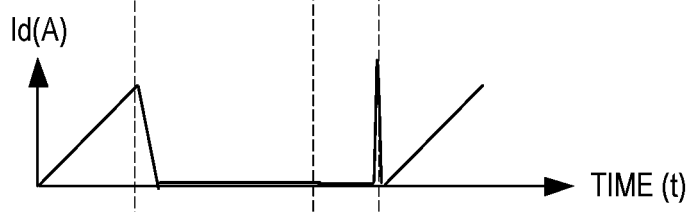
Figure 6D:
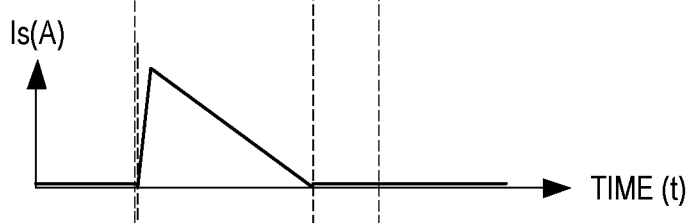
Figure 6E:
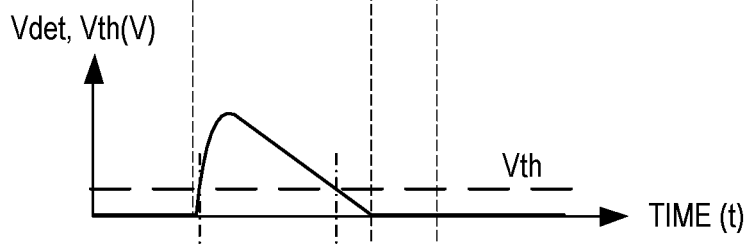
Figure 6F:
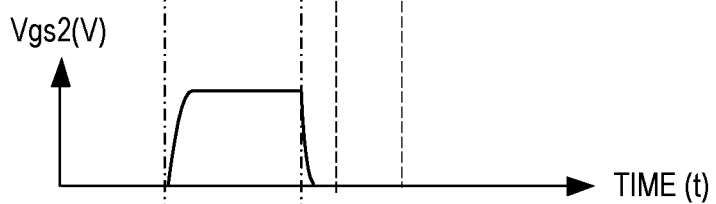
Figure 6G:
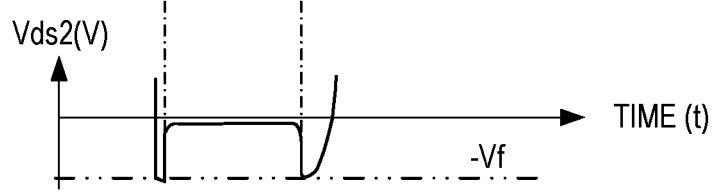

FIG. 5 illustrates a schematic diagram of the switching power supply circuit 101 using the synchronous rectification system of Example 3. Note that the same numerals are given to the same configurations as those in Example 1, and a description of such configurations is omitted. In Example 3, a description is given by using a pseudo resonance circuit that uses a current mode, as the power supply system of the switching power supply circuit 101. Example 3 differs from Example 1 in the configuration of the current detection circuit 112. Note that the same numerals are given to the same configurations as those already described, and a description of such configurations is omitted. In Example 3, let the voltage smoothed by the capacitor 104 for smoothing be a voltage Vc. A description is given by illustrating waveform charts in FIG. 6A to FIG. 6G. FIG. 6A illustrates the gate voltage Vgs1 (V) of the switching element 107, FIG. 6B illustrates the drain-source voltage Vds (V) of the switching element 107, and FIG. 6C illustrates the current Id (A) flowing into the primary winding 108 of the transformer T1. Additionally, FIG. 6D illustrates the current Is flowing into the rectification element 109. In FIG. 6E, a solid line indicates the current detection voltage Vdet obtained by dividing the current Is of the secondary side smoothing capacitor 110 by the dividing capacitor 401 described later, and converting the current Is by the resistor 402, and a broken line indicates a first voltage (hereinafter referred to as a threshold voltage) Vth. Further, FIG. 6F illustrates the gate voltage Vgs2 in a case where a MOSFET is used as the rectification element 109, and FIG. 6G illustrates the drain-source voltage Vds2 (V) of the rectification element 109. In each figure, the horizontal axis represents the time (t).

(Period I to Period III)

A description of the same operation as that in Example 1 is omitted. Note that, in Period II, with the turning off of the switching element 107, the current Is flows into the rectification element 109 as illustrated in FIG. 6D. At this time, the rectification element 109 functions as a diode, and the drain-source voltage Vds2 becomes a forward voltage Vf (the minus direction) as a diode indicated by a two-dot chain line in FIG. 6G. This current Is is detected by the current detection circuit 112, and the gate voltage Vgs2 is output to the gate terminal of the rectification element 109 to turn on the rectification element 109. By turning on the rectification element 109, the drain-source voltage Vds2 of the rectification element 109 exhibits a voltage drop due to the on-resistance Ron of the MOSFET as illustrated in FIG. 6G. Therefore, the voltage that has been applied to the rectification element 109 is decreased (as the absolute value), and the loss generated by the current Is is reduced.

[Current Detection Circuit]

Figure 7:
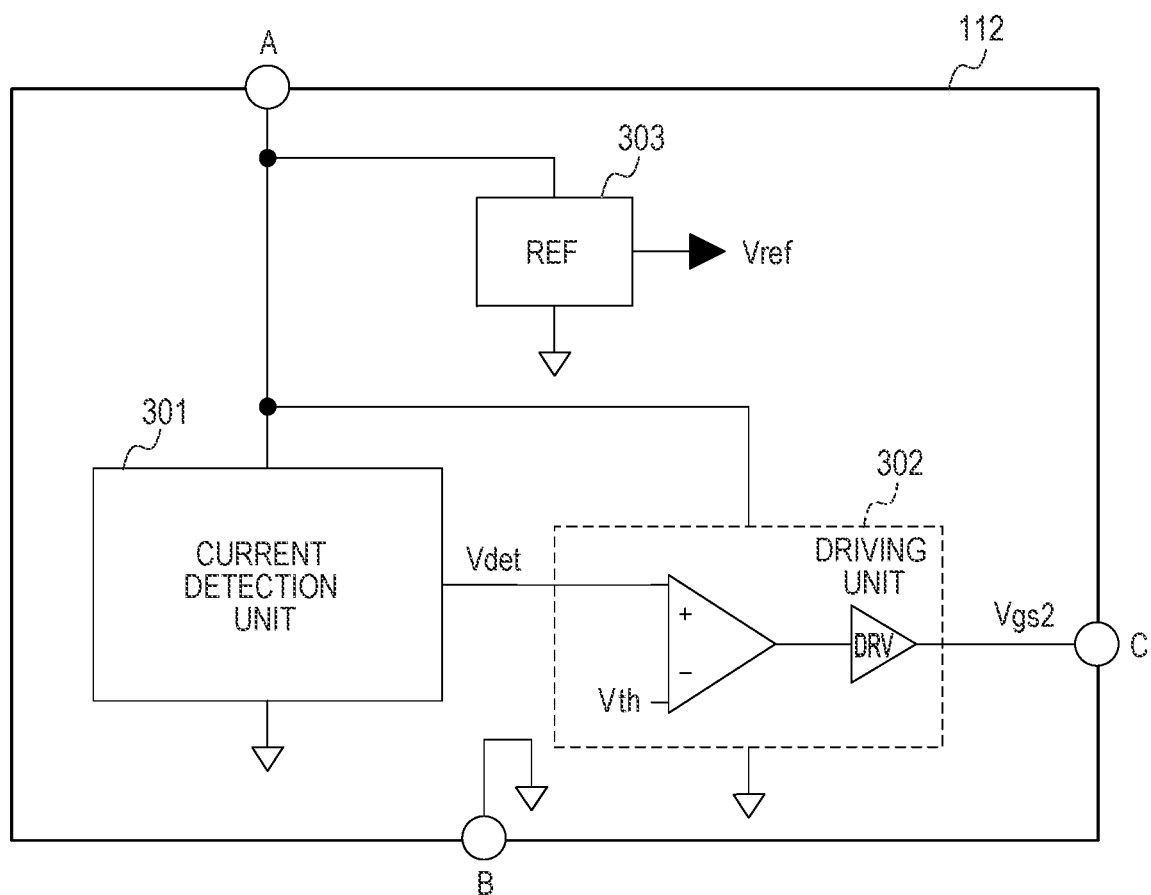
FIG. 7 is a block diagram illustrating a current detection circuit of Example 3.

FIG. 7 illustrates a block diagram of the current detection circuit 112. The current detection circuit 112 includes terminals A and B as inputs that are connected to both ends of the secondary side smoothing capacitor 110, and a terminal C as an output that is connected to the gate terminal of the rectification element 109. The current detection circuit 112 is configured by a current detection unit 301 and a driving unit 302. Additionally, the reference voltage Vref is generated from the potential across the secondary side smoothing capacitor 110 by a shunt regulator or a Zener diode, etc. of REF 303. The current detection unit 301 outputs the current detection voltage Vdet, when the current of the secondary side smoothing capacitor 110 flows in the direction from + to −.

The driving unit 302 includes, for example, a comparator, etc. In a case where the driving unit 302 includes a comparator, etc., the threshold voltage Vth obtained by dividing the reference voltage Vref with a resistance voltage divider, etc. is input to the inverted input terminal of the comparator, and the current detection voltage Vdet is input to the non-inverted input terminal. The comparator compares the threshold voltage Vth with the current detection voltage Vdet. In a case where the current detection voltage Vdet becomes larger than the threshold voltage Vth, the driving unit 302 outputs a driving voltage (i.e., the gate voltage Vgs2 of the rectification element 109). Thus, when the current of the secondary side smoothing capacitor 110 flows in the direction from + to −, the current detection circuit 112 turns on the rectification element 109.

Figure 8:
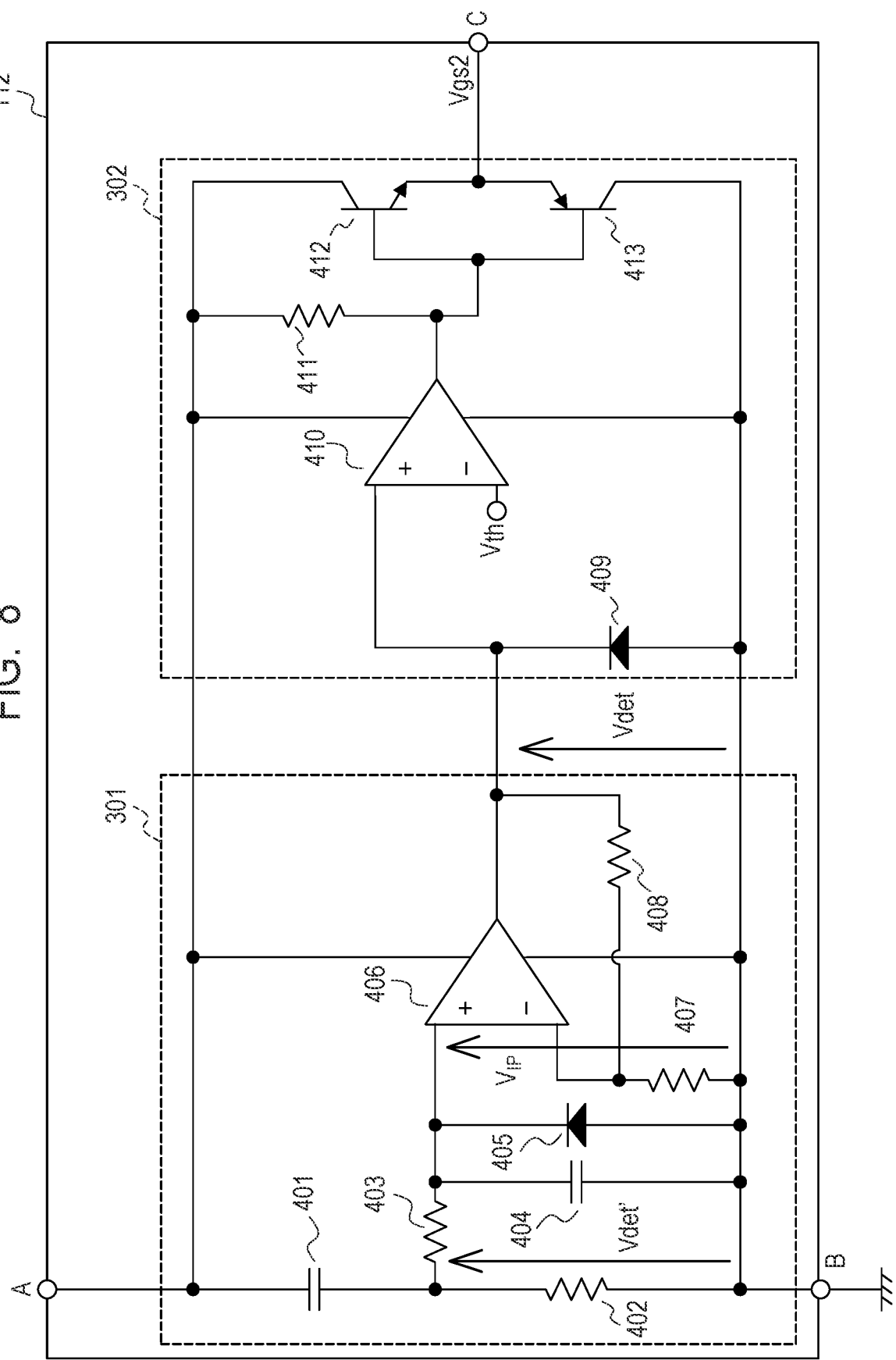
FIG. 8 is a circuit diagram of the current detection circuit of Example 3.

FIG. 8 illustrates an example of the current detection circuit 112. This circuit has a circuit configuration that can perform synchronous rectification driving, even in a case where the switching power supply circuit 101 is in a low-load state (hereinafter referred to as a light-load time). The current detection unit 301 includes the dividing capacitor 401, resistors 402, 403, 407 and 408, a capacitor 404, a diode 405, and an operational amplifier 406. As for the dividing capacitor 401, one end is connected to one end (terminal A) of the secondary side smoothing capacitor 110, and the other end is connected to one end of the resistor 402. The other end of the resistor 402 is connected to a terminal B (GND). The connection point of the dividing capacitor 401 and the resistor 402 is connected to the non-inverted input terminal of the operational amplifier 406 via the resistor 403. The inverted input terminal of the operational amplifier 406 is connected to the terminal B via the resistor 407. As for the operational amplifier 406, an output terminal is connected to the driving unit 302. The inverted input terminal and the output terminal of the operational amplifier 406 are connected via the resistor 408. As for the capacitor 404, one end is connected to the non-inverted input terminal of the operational amplifier 406, and the other end is connected to the terminal B. As for the diode 405, a cathode terminal is connected to the non-inverted input terminal of the operational amplifier 406, and an anode terminal is connected to the terminal B. The resistor 402 and the capacitor 404 constitute a low pass filter.

The driving unit 302 includes a diode 409, a comparator 410, a resistor 411, an NPN-type transistor 412, and a PNP-type transistor 413. The output terminal of the operational amplifier 406 of the current detection unit 301 is connected to the non-inverted input terminal of the comparator 410, and the threshold voltage Vth is input to the inverted input terminal. Additionally, a cathode terminal of the diode 409 is connected to the non-inverted input terminal of the comparator 410. An anode terminal of the diode 409 is connected to the terminal B. As for the transistor 412, a collector terminal is connected to one end (terminal A) of the secondary side smoothing capacitor 110, and an emitter terminal is connected to an emitter terminal of the transistor 413. A base terminal of the transistor 412 is connected to the output terminal of the comparator 410. The resistor 411 is connected between the base terminal and the collector terminal of the transistor 412. As for the transistor 413, an emitter terminal is connected to the emitter terminal of the transistor 412, and a collector terminal is connected to the other end (terminal B) of the secondary side smoothing capacitor 110. A base terminal of the transistor 413 is connected to the output terminal of the comparator 410. The connection point of the emitter terminal of the transistor 412 and the emitter terminal of the transistor 413 is connected to the terminal C, and outputs the gate voltage Vgs2 of the rectification element 109.

[Operation and Waveform of Current Detection Circuit]

Figure 9:
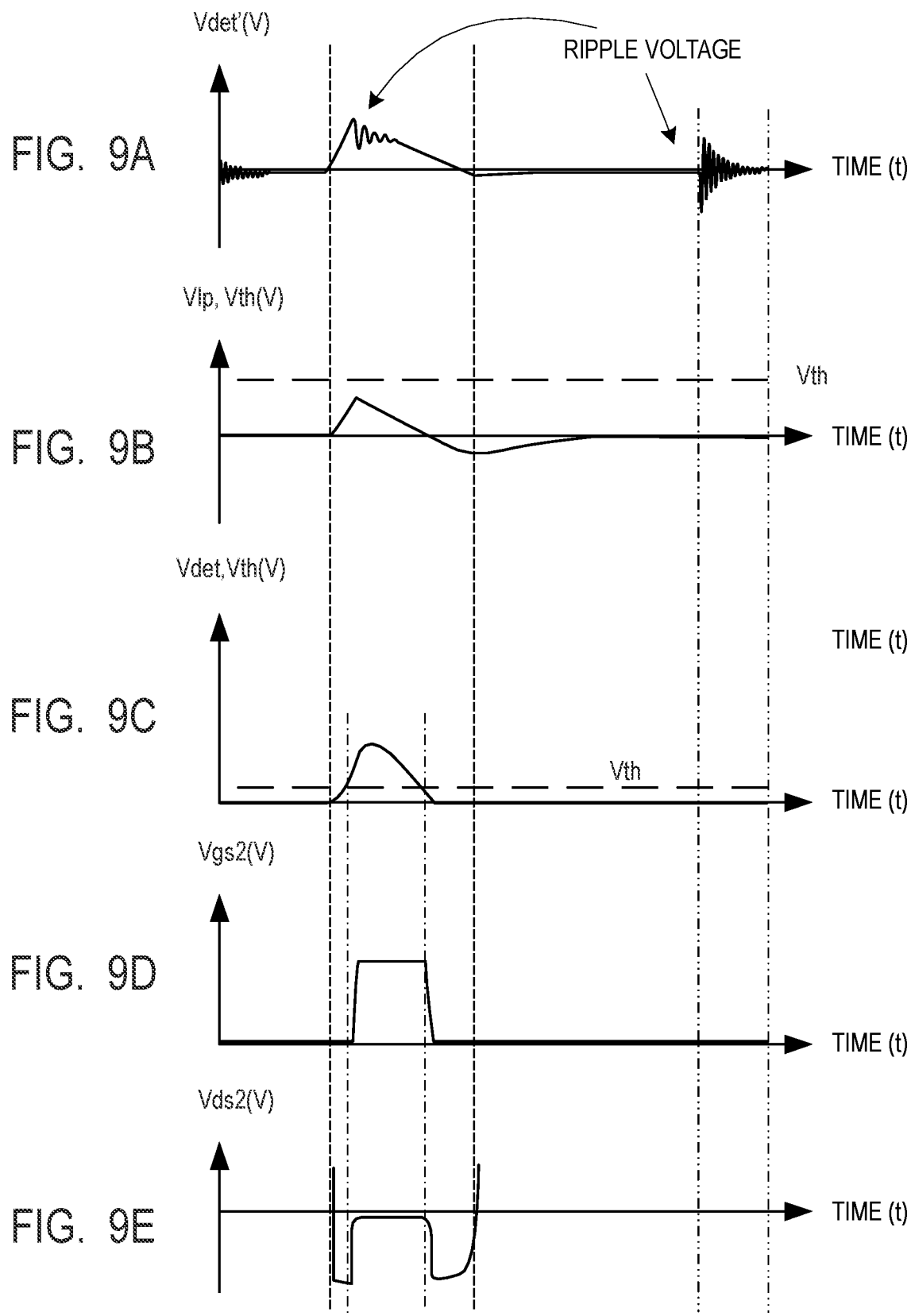
FIGS. 9A, 9B, 9C, 9D and 9E are graphs illustrating the waveform of each part corresponding to a light-load time of Example 3.

The operation of the current detection circuit 112 is described by illustrating waveforms in FIG. 9A to FIG. 9E. FIG. 9A illustrates a detected voltage Vdet' (V) detected by the resistor 402, and FIG. 9B illustrates an output voltage Vlp (V) via a low pass filter, and the threshold voltage Vth (V) with a broken line, respectively. FIG. 9C illustrates the current detection voltage Vdet (V) and the threshold voltage Vth (V) with a broken line, and FIG. 9D illustrates the gate voltage Vgs2 (V) of the rectification element 109. FIG. 9E illustrates the drain-source voltage Vds2 (V) of the rectification element 109. In each figure, the horizontal axis represents the time (t).

In the current detection circuit 112, when the current Is flows into the secondary side smoothing capacitor 110, the potential across the secondary side smoothing capacitor 110 begins to rise. Concurrently, the current flows in the direction from the terminal A of the current detection circuit 112 to the dividing capacitor 401, the resistor 402, and the terminal B, and the current flowing into the dividing capacitor 401 is converted into the detected voltage Vdet' by the resistor 402. However, at the light-load time, as illustrated in FIG. 9A, this detected voltage Vdet' is the voltage on which a ripple voltage is superimposed, since the current value of the current Is is low. In order to remove this ripple voltage, a low pass filter including the resistor 403 and the capacitor 404 is connected to the resistor 402.

The detected voltage Vdet' on which the ripple voltage is superimposed is output to the operational amplifier 406 via the low pass filter. Let the voltage obtained by removing the ripple voltage by the low pass filter be the output voltage Vlp. As illustrated in FIG. 9B, the output voltage Vlp is the voltage obtained by detecting the current Is charging the secondary side smoothing capacitor 110, and removing the ripple. However, even if the ripple voltage is removed, since the current value is small, the value of the output voltage Vlp may be low, and unable to exceed the threshold voltage Vth. Therefore, in order to amplify the output voltage Vlp, an amplification circuit, which is an amplification unit including the operational amplifier 406 and the resistors 407 and 408, is connected to the capacitor 404. Note that the capacitor 404 is connected to the non-inverted input terminal (+terminal) of the operational amplifier 406. On the other hand, the voltage obtained by dividing the output voltage of the operational amplifier 406 by the resistors 407 and 408 is applied to the inverted input terminal (−terminal) of the operational amplifier 406.

The output terminal of the operational amplifier 406 is connected to the non-inverted input terminal (+terminal) of the comparator 410. On the other hand, the threshold voltage Vth is applied to the inverted input terminal (−terminal) of the comparator 410. As illustrated in FIG. 9C, the current detection voltage Vdet can be input to the comparator 410 by enabling the current detection voltage Vdet obtained by amplifying the output voltage Vlp by the amplification circuit to exceed the threshold voltage Vth. The comparator 410 compares the amplified current detection voltage Vdet with the threshold voltage Vth, and in a case where the amplified current detection voltage Vdet becomes higher than the threshold voltage Vth, the comparator 410 renders the output to be in an open state. Then, the driving circuit ("DRV" in FIG. 7) including the resistor 411 and the transistors 412 and 413 raises the gate voltage Vgs2 of the rectification element 109 as illustrated in FIG. 9D, and renders the rectification element 109 to be in a turn-on state. Thus, as illustrated in FIG. 9E, also at the light-load time, the gate voltage Vgs2 forms a waveform of voltage drop due to the on-resistance Ron from the forward voltage Vf of the diode of the rectification element 109, and the synchronous rectification driving at the light-load time can be realized.

The current Is flowing into the rectification element 109 forms a waveform in which the current value at the time when the current Is beings to flow is high, and is linearly decreased as illustrated in FIG. 6D. Accordingly, the loss in the rectification element 109 is large at the timing when the current beings to flow into the rectification element 109, and gradually becomes small as the current is decreased. In a case where a further improvement effect of the efficiency is required, it is effective to make the time delay with respect to the timing at which the current Is beings to flow small. For such a goal, as a method of enhancing the detection of rising of the current Is that charges the secondary side smoothing capacitor 110, it is effective to make the time constant for the dividing capacitor 401 and the resistor 402 of the current detection unit 301 earlier than the time constant for the secondary side smoothing capacitor 110. On the other hand, although the off timing of the rectification element 109 becomes early by making the time constant for the dividing capacitor 401 and the resistor 402 of the current detection unit 301 shorter, since the current value is low near the end of the flow of the current Is, there is little influence.

In Example 3, the example has been illustrated in which, for example, the N-channel MOSFET is used as the rectification element 109. Between the secondary winding 111 of the transformer T1 and the ground, connection is made such that the ground serves as a source terminal, and the secondary winding 111 side serves as a drain terminal. This is for facilitating the gate driving, and whether the power supply side or the ground side of the secondary winding 111 of the transformer T1 should be selected may be determined depending on what kind of element is connected as the rectification element 109.

As described above, according to Example 3, the efficiency of the power supply apparatus of the synchronous rectification system can be improved.

[Power Supply Apparatus]

Figure 10:
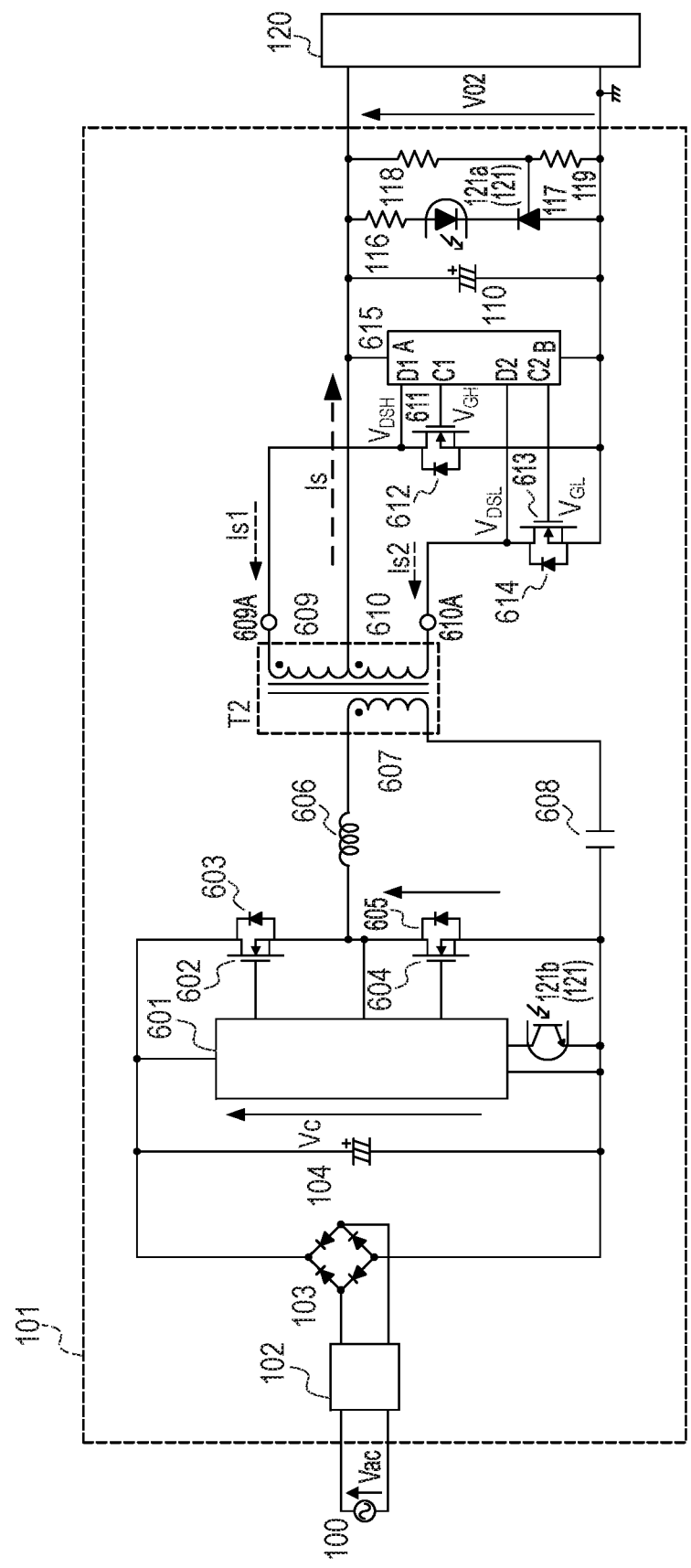
FIG. 10 is a circuit diagram of the switching power supply circuit using a synchronous rectification system of Example 4.

FIG. 10 illustrates a current resonance circuit using the synchronous rectification system, which is the switching power supply circuit 101 of Example 4. The transformer T2 of the switching power supply circuit 101 of Example 4 includes a secondary winding 609, which is the first secondary winding, and a secondary winding 610, which is the second secondary winding. Additionally, a rectification element 611, which is the first rectification unit connected to the secondary winding 609, and a rectification element 613, which is the second rectification unit connected to the secondary winding 610, are included. The same numerals are given to the same configurations as those in Examples 1 and 3, and a description of such configurations is omitted. In the current resonance circuit, the connection of the transformer T2 is generally made by forming the secondary winding into a center tap configuration, and a center tap is connected as the ground. The other ends of the secondary winding are often connected to diodes, respectively, and rectification and smoothness are performed. However, in a case where the diode is changed to a switch element such as a general N-channel MOSFET in such a connection, since it is necessary to make the gate voltage of the switch element higher than the source voltage, a voltage higher than the output voltage is required. Thus, in Example 4, as illustrated in FIG. 10, the secondary windings 609 and 610 of the transformer T2 are connected to the drain terminal side of the N-channel MOSFET, respectively, and the source terminal side is connected to the ground (GND), without forming the center tap into a ground connecting configuration. The switch element of the N-channel MOSFET is hereinafter referred to as the rectification elements 611 and 613. Although the rectification elements 611 and 613 include body diodes 612 and 614, respectively, the rectification elements 611 and 613 may be external diodes connected in parallel with the rectification elements 611 and 613.

The switching power supply circuit 101 includes a switching control unit 601, a switching element 602, which is the first switching element provided on the high-side side, and a diode 603, which is incorporated in or externally provided to the switching element 602. The switching power supply circuit 101 includes a switching element 604, which is the second switching element provided on the low-side side, and a diode 605, which is incorporated in or externally provided to the switching element 604. In the current resonance circuit, the switching control unit 601 alternately drives the switching element 602 and the switching element 604 with, for example, 50% on-duty (turn-on time), while providing the dead time, which is the period during which both of the elements are in turn-off states.

As for the primary winding 607 of the transformer T2, one end is connected to an inductor 606, and the other end is connected to a resonance capacitor 608, so as to form a resonant circuit. The secondary winding 609 of the transformer T2 is transmitting the voltage applied to the primary winding 607 of the transformer T2 to the secondary side with another secondary winding 610 of the transformer T2. The center taps of the secondary windings 609 and 610 are connected to the +terminal of the secondary side smoothing capacitor 110, and the −terminal (GND terminal) side of the secondary side smoothing capacitor 110 is connected to the source terminals of the rectification elements 611 and 613. Then, the drain terminal of the rectification element 611 is connected to the secondary winding 609, and the drain terminal of the rectification element 613 is connected to the secondary winding 610. Further, let the connection point of the rectification element 611 and the secondary winding 609 be a terminal 609A, and let the connection point of the rectification element 613 and the secondary winding 610 be a terminal 610A. With such connections, there is no need to use a special power supply for the gate voltage, since the source terminal serves as the GND terminal in both of the rectification elements 611 and 613. Therefore, the circuit can be simply configured.

[Current Detection Circuit]

As in Example 3, the current detection circuit 615 detects the current Is flowing into the secondary side smoothing capacitor 110, and terminals A and B are connected to both ends of the secondary side smoothing capacitor 110. Additionally, terminals C1 and C2 of the current detection circuit 615 are connected to the gate terminals of the rectification elements 611 and 613, respectively. The current detection circuit 615 outputs a gate voltage $V_{GH}$ to the gate terminal of the rectification element 611 from the terminal C1, and outputs a gate voltage $V_{GL}$ to the gate terminal of the rectification element 613 from the terminal C2. The terminals 609A and 610A are terminals that connect the secondary windings 609 and 610 to the rectification elements 611 and 613, respectively. Terminals D1 and D2 of the current detection circuit 615 are connected to the terminals 609A and 610A, and a voltage $V_{DSH}$ of the terminal 609A and a voltage $V_{DSL}$ of the terminal 610A are input to the terminals D1 and D2, respectively. The current detection circuit 615 determines which of the rectification element 611 and the rectification element 613 should be turned on, based on the voltages $V_{DSH}$ and $V_{DSL}$ that are input to the terminals D1 and D2 (hereinafter referred to as terminal voltages). A difference from Example 3 is that, first, the terminal C2 is added to the current detection circuit 615, since the number of rectification elements on the secondary side is increased by one. Additionally, the terminals D1 and D2 to which the terminal voltages $V_{DSH}$ and $V_{DSL}$ are input are added to the current detection circuit 615. The details of the current detection circuit 615 are described later with reference to FIG. 12.

[Block Diagram of Current Detection Circuit]

Figure 11:
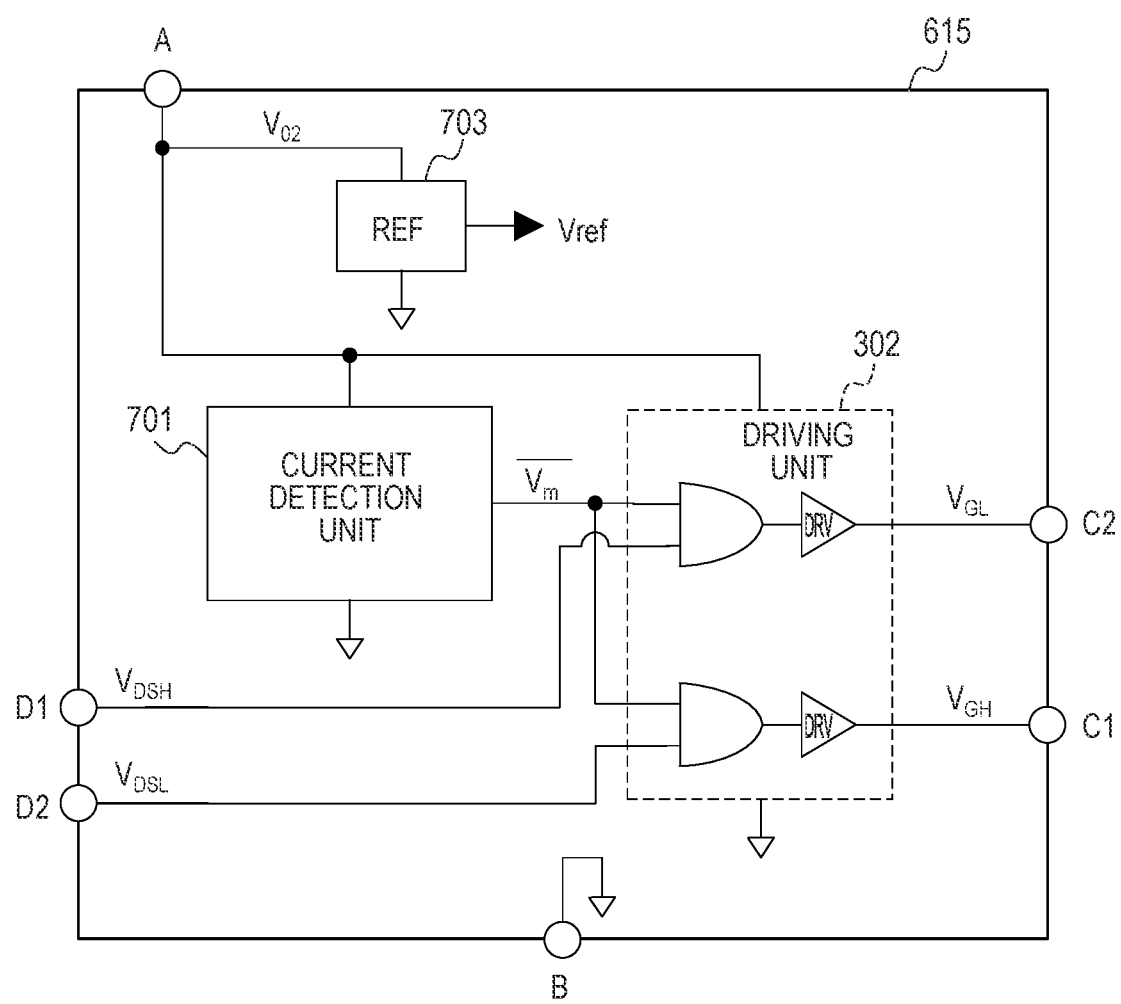
FIG. 11 is a block diagram illustrating the current detection circuit of Example 4.

FIG. 11 illustrates a block diagram of the current detection circuit 615. The current detection circuit 615 includes a current detection unit 701, and a driving unit 702. Additionally, a reference voltage Vref is generated by a REF 703 from the potential (secondary side voltage V02) across the secondary side smoothing capacitor 110. In Example 4, the signal detected by the current detection unit 701 is used as a mask voltage Vm. The detection of the mask voltage Vm at a low level is made effective (hereinafter referred to as a low-level active), in order to use the mask voltage Vm as a signal for masking an interval (hereinafter referred to as a non-detection interval) during which the current detection is not performed. The bar on the mask voltage Vm in FIG. 11 means the above-described matter. In a case where the mask voltage Vm is in a low level state, i.e., where the mask voltage Vm is in an interval without masking, the driving unit 702 performs the following control. That is, in a case where, for example, the terminal voltage $V_{DSH}$ of the terminal 609A is a positive voltage, the driving unit 702 turns off the rectification element 611 connected to the secondary winding 609, and turns on the rectification element 613 connected to the terminal 610A. On the other hand, in a case where the terminal voltage $V_{DSL}$ of the terminal 610A is a positive voltage, the driving unit 702 turns off the rectification element 613 connected to the secondary winding 610, and turns on the rectification element 611 connected to the terminal 609A.

[Operation of Current Detection Circuit]

Figure 12:
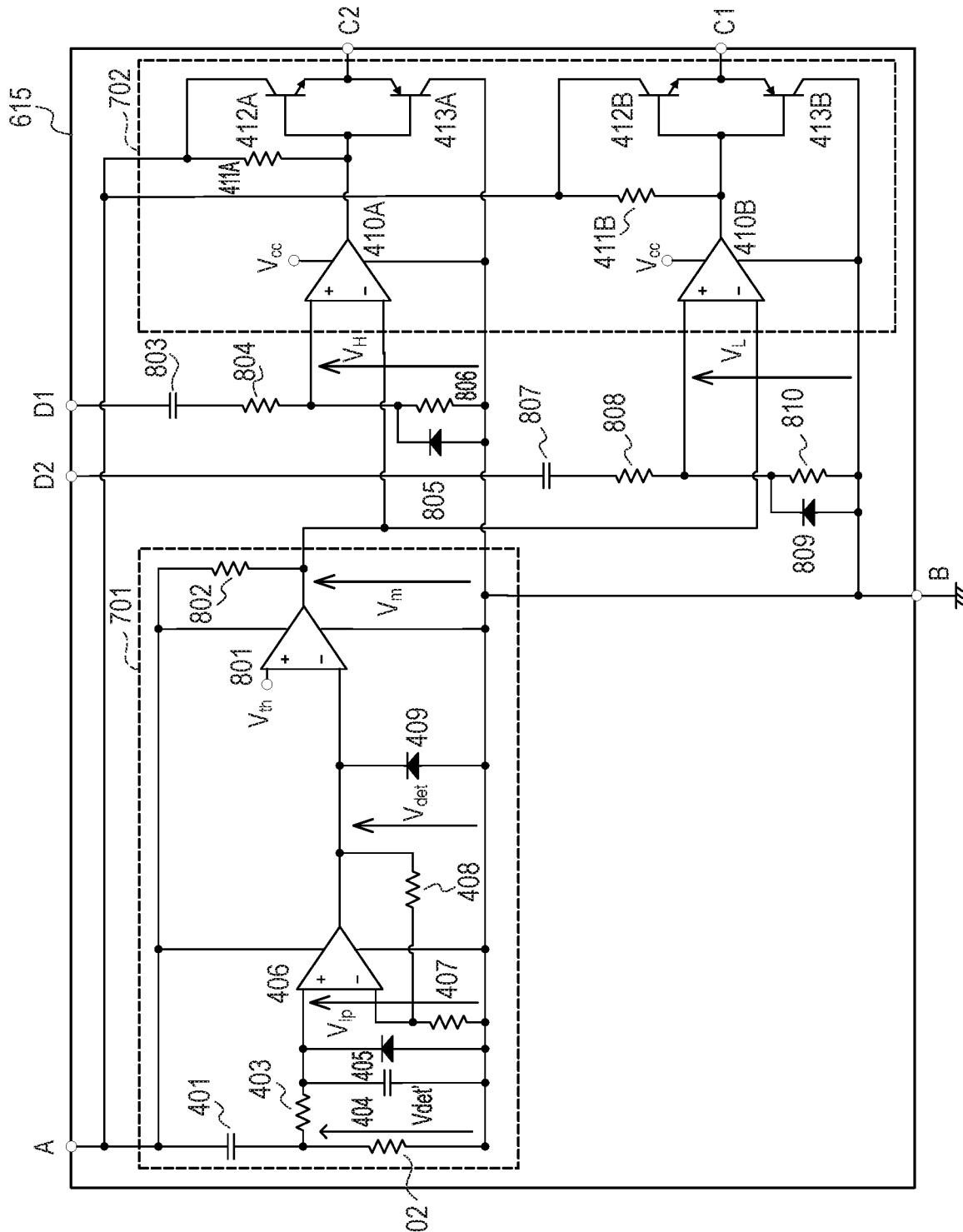
FIG. 12 is a circuit diagram of the current detection circuit of Example 4.

The operation of the current detection circuit 615 is described by using FIG. 12 and FIG. 13A to FIG. 13F. FIG. 12 illustrates a circuit diagram of the current detection unit 701 and the driving unit 702. Note that the same numerals are given to the same configurations as those in Example 3, and as for the driving unit 702, a subscript A is given to the configurations of the terminal C2, and a subscript B is given to the configurations of the terminal C1. The current detection unit 701 includes the dividing capacitor 401, the resistors 402, 403, 407 and 408, the capacitor 404, the diode 405, and the operational amplifier 406. These are the same as those in Example 3. In Example 4, the current detection unit 701 further includes a comparator 801, and a resistor 802. As for the comparator 801, a current detection voltage Vdet is input to an inverted input terminal, and the threshold voltage Vth is input to a non-inverted input terminal. An output of the comparator 801 is output to the driving unit 702 as the mask signal Vm. The resistor 802 is connected between the terminal A and the output terminal of the comparator 801.

The driving unit 702 includes diodes 805 and 809, comparators 410A and 410B, resistors 411A and 411B, NPN-type transistors 412A and 412B, and PNP type transistors 413A and 413B. The mask signal Vm output from the current detection unit 701 is input to the inverted input terminal of the comparator 410A. Capacitor 803 and resistors 804 and 806 are connected in series between the terminal D1 and the terminal B, and the connection point of the resistor 804 and the resistor 806 is connected to the non-inverted input terminal of the comparator 410A. Let the voltage input to the non-inverted input terminal of the comparator 410A be a voltage $V_H$. The diode 805 is connected in parallel to the resistor 806. As for the diode 805, a cathode terminal is connected to the connection point of the resistor 804 and the resistor 806, and an anode terminal is connected to the terminal B. As for the transistor 412A, a collector terminal is connected to the terminal A, and an emitter terminal is connected to an emitter terminal of the transistor 413A. A base terminal of the transistor 412A is connected to an output terminal of the comparator 410A. The resistor 411A is connected between the base terminal and the collector terminal of the transistor 412A. As for the transistor 413A, an emitter terminal is connected to the emitter terminal of the transistor 412A, and a collector terminal is connected to the terminal B. A base terminal of the transistor 413A is connected to the output terminal of the comparator 410A. The connection point of the emitter terminal of the transistor 412A and the emitter terminal of the transistor 413A is connected to the terminal C2, and outputs the gate voltage $V_{GL}$ of the rectification element 613.

The mask signal Vm output from the current detection unit 701 is input to the inverted input terminal of the comparator 410B. A capacitor 807 and resistors 808 and 810 are connected in series between the terminal D2 and the terminal B, and the connection point of the resistor 808 and the resistor 810 is connected to the non-inverted input terminal of the comparator 410B. Let the voltage input to the non-inverted input terminal of the comparator 410B be a voltage $V_L$. A diode 809 is connected in parallel to the resistor 810. As for the diode 809, a cathode terminal is connected to the connection point of the resistor 808 and the resistor 810, and an anode terminal is connected to the terminal B. Subsequently, the subscript "A" of the above-described components may be replaced with "B", and a description of such components is omitted. Note that the connection point of the emitter terminal of the transistor 412B and the emitter terminal of the transistor 413B is connected to the terminal C1, and outputs the gate voltage $V_{GH}$ of the rectification element 611.

[Operations and Waveforms of Current Detection Circuit]

Figure 13:
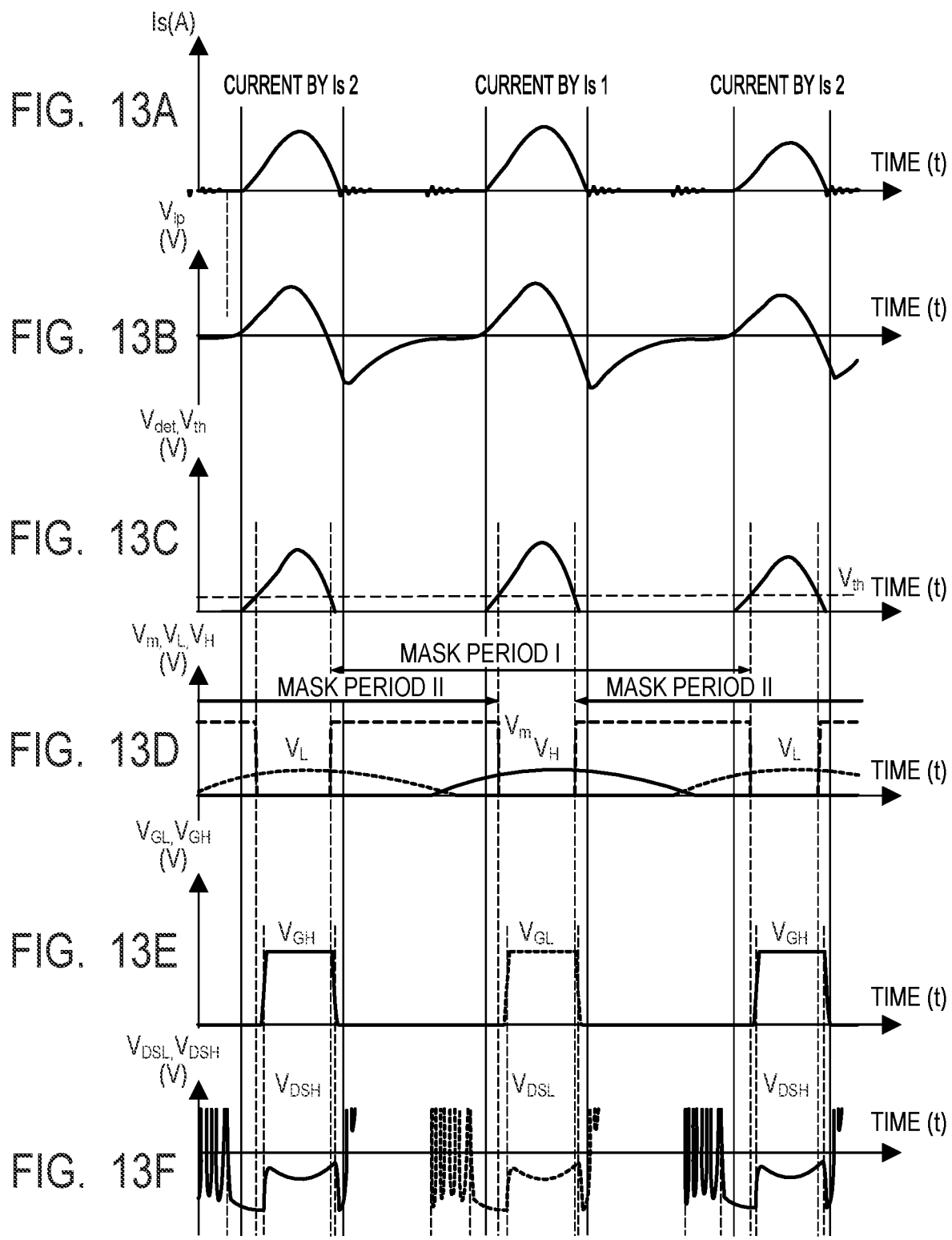
FIGS. 13A, 13B, 13C, 13D, 13E and 13F are graphs for describing the waveforms and operations of each part of Example 4.

FIG. 13A illustrates the current Is (A) flowing into the secondary side smoothing capacitor 110, and FIG. 13B illustrates the output voltage Vlp (V) via a low pass filter. FIG. 13C illustrates the current detection voltage Vdet (V) and the threshold voltage Vth (V) with a broken line, and FIG. 13D illustrates the mask voltage Vm, the voltage $V_H$ and $V_L$ input to the non-inverted input terminals of the comparators 410A and 410B. In FIG. 13D, the waveform of the mask signal Vm is illustrated with a broken line, the voltage $V_H$ is illustrated with a solid line, and the voltage $V_L$ is illustrated with a dotted line. FIG. 13E illustrates the gate voltages $V_{GH}$ and $V_{GL}$ of the rectification elements 611 and 613, and FIG. 13F illustrates the terminal voltages $V_{DSL}$ and $V_{DSH}$. In FIG. 13E, the gate voltage $V_{GH}$ is illustrated with a solid line, and the gate voltage $V_{GL}$ is illustrated with a dotted line, and in FIG. 13F, the terminal voltage $V_{DSH}$ is illustrated with a solid line, and the terminal voltage $V_{DSL}$ is illustrated with a dotted line. In each figure, the horizontal axis represents the time.

First, the terminals D1 and D2 added to the current detection circuit 615 will be described. The reason for the addition is that the current detection circuit 615 detects the current Is that charges the secondary side smoothing capacitor 110 as illustrated in FIG. 13A. That is, the current detection circuit 615 cannot determine whether the current Is1 is flowing into the secondary winding 609, or the current Is2 is flowing into the secondary winding 610. Therefore, the current detection circuit 615 generates the gate voltages $V_{GH}$ and $V_{GL}$ of the rectification elements 611 and 613 based on the terminal voltages $V_{DSH}$ and $V_{DSL}$ that are input to the terminals D1 and D2 by using the detection signal of the current as the mask signal Vm. It can be said that the current detection circuit 615 is detecting the voltage of the secondary winding 609 and the voltage of the secondary winding 610. In this sense, the current detection circuit 615 also functions as a first voltage detection unit that detects the voltage induced by the secondary winding 609, and as a second voltage detection unit that detects the voltage induced by the secondary winding 610.

Next, a description will be given from the detection of the current Is for charging the secondary side smoothing capacitor 110 to the driving of the rectification elements 611 and 613 by the current detection circuit 615. A current flows in the direction from the terminal A to the dividing capacitor 401, the resistor 402, and the terminal B, and the current Is flowing into the dividing capacitor 401 is converted into the detected voltage Vdet' by the resistor 402. At this time, in the synchronous rectification of a current resonance circuit, in order to avoid the short circuit by the rectification elements 611 and 613, it is necessary to turn off a switch before the conduction of the rectification elements 611 and 613 ends. Therefore, in Example 4, a method of adjusting the off-time by making the time constant for the dividing capacitors 401 and resistor 402 shorter than the time constant for the secondary side smoothing capacitor 110 is used as an example.

Next, in order to remove the ripple voltage superimposed on the detected voltage Vdet' converted by the resistor 402, a low pass filter including the resistor 403 and the capacitor 404 is connected to the resistor 402. As illustrated in FIG. 13B, the output voltage Vlp via the low pass filter forms a waveform from which the ripple is removed. Additionally, since the time constant is made shorter, the time until 0 V is reached is quick compared with that in FIG. 13A. As illustrated in FIG. 13C, the output voltage Vlp is amplified to the detected voltage Vdet by the operational amplifier 406, so that the output voltage Vlp from the low pass filter can exceed the threshold voltage Vth even in a low load state. In a case where the detected voltage Vdet is compared with the threshold voltage Vth, and the threshold voltage Vth exceeds the detected voltage Vdet, the comparator 801 outputs a high-level mask voltage Vm, as illustrated with the broken line in FIG. 13D. The mask voltage Vm is at a low level in a case where the threshold voltage Vth is equal to or less than the detected voltage Vdet.

In the driving unit 702, as for the comparator 410A, the voltage $V_H$ obtained by dividing the terminal voltage $V_{DSH}$ input from the terminal D1 by the resistors 804 and 806 is input to a non-inverted input terminal, and the mask voltage Vm is input to an inverted input terminal. The comparator 410A compares the voltage $V_H$ and the mask voltage Vm, and in a case where the mask voltage Vm is higher than the voltage $V_H$, the comparator 410A outputs a low-level gate voltage $V_{GL}$ from the terminal C2 as illustrated in FIG. 13E. On the other hand, the comparator 410A compares the voltage $V_H$ and the mask voltage Vm, and in a case where the voltage $V_H$ is higher than the mask voltage Vm, the comparator 410A outputs a high-level gate voltage $V_{GL}$ from the terminal C2, and drives the rectification element 613 as illustrated in FIG. 13E. A period during which the control of the rectification element 611 is masked is defined as Mask Period I.

In the driving unit 702, as for the comparator 410B, the voltage $V_L$ obtained by dividing the terminal voltage $V_{DSL}$ input from the terminal D2 by the resistors 808 and 810 is input to a non-inverted input terminal, and the mask voltage Vm is input to an inverted input terminal. The comparator 410B compares the voltage $V_L$ and the mask voltage Vm, and in a case where the mask voltage Vm is higher than the voltage $V_L$, the comparator 410B outputs a low-level gate voltage $V_{GH}$ from the terminal C1 as illustrated in FIG. 13E. On the other hand, the comparator 410B compares the voltage $V_L$ and the mask voltage Vm, and in a case where the voltage $V_L$ is higher than the mask voltage Vm, the comparator 410B outputs a high-level gate voltage $V_{GH}$ from the terminal C1, and drives the rectification element 611 as illustrated in FIG. 13E. A period during which the control of the rectification element 613 is masked is defined as Mask Period II. Accordingly, as illustrated in FIG. 13F, ringing that occurs at the time of switching of the diodes 612 and 614 from off to on can be avoided, and the driving of the rectification elements 611 and 613 used for synchronous rectification can be realized.

As described above, according to Example 4, the efficiency of the power supply apparatus of the synchronous rectification system can be improved.

Example 5

The power supply apparatuses described in Examples 1 to 4 are applicable to, for example, a low voltage power supply of an image forming apparatus, i.e., a power supply that supplies electric power to a controller (control unit) and a driving unit such as a motor, etc. The configuration of an image forming apparatus to which the power supply apparatuses of Examples 1 to 4 are applied will be described below.

[Configuration of Image Forming Apparatus]

Figure 14:
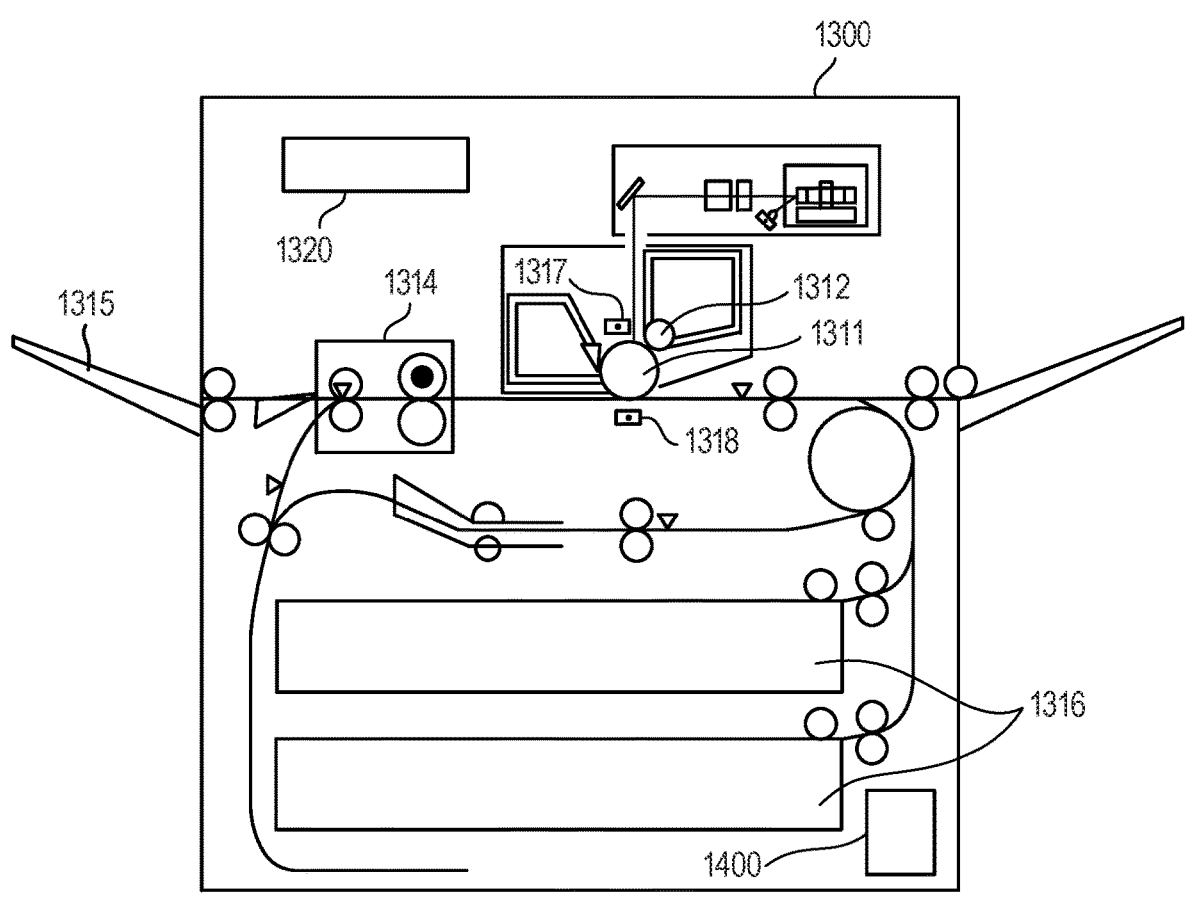
FIG. 14 is a diagram illustrating an image forming apparatus of Example 5.

As an example of an image forming apparatus, a laser beam printer is described as an example. FIG. 14 illustrates a schematic configuration of a laser beam printer, which is an example of a printer of the electrophotography system. A laser beam printer 1300 includes a photosensitive drum 1311 as an image bearing unit in which an electrostatic latent image is formed, and a charge unit 1317 (charge unit) that uniformly charges the photosensitive drum 1311. The laser beam printer 1300 includes a developing unit 1312 (developing unit) that develops the electrostatic latent image formed on the photosensitive drum 1311 with a toner. Then, a toner image developed on the photosensitive drum 1311 is transferred to a sheet (not shown) as a recording material supplied from a cassette 1316 by a transfer unit 1318 (transfer unit), and the toner image transferred to the sheet is fixed by a fixing device 1314, and is discharged to a tray 1315. These photosensitive drum 1311, charge unit 1317, developing unit 1312, and transfer unit 1318 are included in an image forming unit. Additionally, the laser beam printer 1300 includes the switching power supply circuit 101 described in Examples 1 to 4 as a power supply apparatus 1400. Note that the image forming apparatus to which the power supply apparatus 1400 can be applied is not limited to the image forming apparatus illustrated in FIG. 14, and may be, for example, an image forming apparatus including a plurality of image forming units. Further, the image forming apparatus may be an image forming apparatus including a primary transfer unit that transfers the toner image on the photosensitive drum 1311 to an intermediate transfer belt, and a secondary transfer unit that transfers the toner image on the intermediate transfer belt to a sheet.

The laser beam printer 1300 includes a controller 1320 that controls the image forming operation by the image forming unit, and the conveying operation of sheets, and the switching power supply circuit 101 described in Examples 1 to 4 supplies electric power to, for example, a controller 1320. Additionally, the switching power supply circuit 101 described in Examples 1 to 4 supplies electric power to the driving unit such as a motor for rotating the photosensitive drum 1311 or for driving various rollers, etc. that convey sheets. That is, the load 120 of Examples 1 to 4 corresponds to the controller 1320 and the driving unit. In a case where the image forming apparatus of Example 5 is in a standby state (for example, a power saving mode or a standby mode) that realizes power saving, the image forming apparatus of Example 5 can reduce the power consumption by decreasing the load by, for example, supplying electric power only to the controller 1320, etc. That is, in the image forming apparatus of Example 5, even at the time of the power saving mode (light-load time), as described in Examples 3 and 4, the current detection voltage Vdet can exceed the threshold voltage Vth.

As described above, according to Example 5, the efficiency of the power supply apparatus of the synchronous rectification system can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-189551, filed Oct. 4, 2018, which is hereby incorporated by reference herein in its entirety.

What is claimed is:

1. A power supply apparatus of a synchronous rectification system, comprising:
   a transformer including a primary winding and a secondary winding;
   at least one switching element configured to turn on or off a current flowing into the primary winding;
   a rectification unit configured to be driven to rectify a current flowing into the secondary winding;
   a secondary-side smoothing element configured to smooth a voltage rectified by the rectification unit;
   a current detection unit configured to detect a current for charging the secondary-side smoothing element; and
   a driving unit configured to drive the rectification unit based on a detection result by the current detection unit,
   wherein the current detection unit comprises a capacitor configured to divide the current flowing into the secondary winding, a resistor configured to convert the current of the capacitor into a voltage, and a comparator configured to compare the voltage converted by the resistor and a first voltage,
   wherein the driving unit outputs a voltage for driving the rectification unit based on a comparison result by the comparator,
   wherein the current detection unit comprises a low pass filter for removing a ripple generated in the voltage converted by the resistor, and an amplification unit configured to amplify the voltage output from the low pass filter, and
   wherein the comparator compares the voltage amplified by the amplification unit with the first voltage.

2. A power supply apparatus according to claim 1, wherein the driving unit drives the rectification unit in a case where the voltage converted by the resistor is higher than the first voltage as a result of comparison by the comparator.

3. A power supply apparatus according to claim 1, wherein the driving unit drives the rectification unit in a case where the voltage amplified is higher than the first voltage as a result of comparison by the comparator.

4. A power supply apparatus according to claim 1, comprising:
   a feedback unit configured to output a signal according to the voltage of the secondary-side smoothing element to a primary side; and
   a control unit configured to control the switching element based on the signal input by the feedback unit,
   wherein the at least one switching element is connected in series to the primary winding.

5. A power supply apparatus according to claim 1,
   wherein the secondary winding includes a first secondary winding and a second secondary winding, and
   wherein the rectification unit includes a first rectification unit connected to the first secondary winding, and a second rectification unit connected to the second secondary winding,
   the power supply apparatus comprising:
   a first voltage detection unit configured to detect a voltage induced by the first secondary winding;
   a second voltage detection unit configured to detect a voltage induced by the second secondary winding; and
   a mask unit configured to perform masking so that one of the first rectification unit and the second rectification unit is not driven, based on detection results of the first voltage detection unit and the second voltage detection unit.

6. A power supply apparatus according to claim 5,
   wherein the first rectification unit and the second rectification unit are field effect transistors,
   wherein in the first rectification unit, a drain terminal of is connected to the first secondary winding, and a source terminal is connected to a ground, and
   wherein in the second rectification unit, a drain terminal is connected to the second secondary winding, and a source terminal is connected to the ground.

7. A power supply apparatus according to claim 5,
   wherein the mask unit turns off the second rectification unit in a case where a voltage of the first secondary winding detected by the first voltage detection unit is higher than a second voltage, and turns off the first rectification unit in a case where a voltage of the second secondary winding detected by the second voltage detection unit is higher than the second voltage.

8. A power supply apparatus according to claim 7,
   wherein the current detection unit comprises a low pass filter for removing a ripple generated in the voltage converted by the resistor, and an amplification unit configured to amplify the voltage output from the low pass filter, and
   wherein the comparator compares the voltage amplified by the amplification unit with the first voltage.

9. A power supply apparatus according to claim 5,
   wherein the switching element includes a first switching element connected in series to the primary winding, and a second switching element connected in parallel with the primary winding, the power supply apparatus comprising:
a resonance capacitor connected in series to the primary winding;
a feedback unit configured to output a signal according to the voltage of the secondary-side smoothing element to the primary side; and
a control unit configured to control the first switching element and the second switching element based on the signal input by the feedback unit.

10. An image forming apparatus comprising:
an image forming unit configured to form an image on a recording material; and
a power supply apparatus of a synchronous rectification system, the power supply apparatus being configured to supply electric power to the image forming unit,
the power supply apparatus comprising:
a transformer including a primary winding and a secondary winding;
at least one switching element configured to turn on or off a current flowing into the primary winding;
a rectification unit configured to be driven to rectify a current flowing into the secondary winding;
a secondary-side smoothing element configured to smooth a voltage rectified by the rectification unit;
a current detection unit configured to detect a current for charging the secondary-side smoothing element; and
a driving unit configured to drive the rectification unit based on a detection result by the current detection unit,
wherein the current detection unit comprises a capacitor configured to divide the current flowing into the secondary winding, a resistor configured to convert the current of the capacitor into a voltage, and a comparator configured to compare the voltage converted by the resistor and a first voltage,
wherein the driving unit outputs a voltage for driving the rectification unit based on a comparison result by the comparator,
wherein the current detection unit comprises a low pass filter for removing a ripple generated in the voltage converted by the resistor, and an amplification unit configured to amplify the voltage output from the low pass filter, and
wherein the comparator compares the voltage amplified by the amplification unit with the first voltage.

11. An image forming apparatus according to claim 10, comprising:
a controller configured to control the image forming unit; and
a driving unit configured to drive the image forming unit,
wherein the power supply apparatus supplies electric power to one of the controller and the driving unit.

12. An image forming apparatus according to claim 11, wherein in a case of a power-saving state, the power supply apparatus supplies electric power only to the controller.

* * * * *